(12) United States Patent
Martineau et al.

(10) Patent No.: US 11,995,564 B2
(45) Date of Patent: May 28, 2024

(54) SYSTEM AND METHOD FOR GENERATING ASPECT-ENHANCED EXPLAINABLE DESCRIPTION-BASED RECOMMENDATIONS

(71) Applicant: Samsung Electronics Co., Ltd., Suwon-si (KR)

(72) Inventors: Justin C. Martineau, Mountain View, CA (US); Christian Koehler, Sunnyvale, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1113 days.

(21) Appl. No.: 16/246,775

(22) Filed: Jan. 14, 2019

(65) Prior Publication Data

US 2019/0392330 A1  Dec. 26, 2019

Related U.S. Application Data

(60) Provisional application No. 62/688,196, filed on Jun. 21, 2018.

(51) Int. Cl.
*G06N 5/04* (2023.01)
*G06F 16/901* (2019.01)
*G06N 20/00* (2019.01)

(52) U.S. Cl.
CPC ........... *G06N 5/04* (2013.01); *G06F 16/9024* (2019.01); *G06N 20/00* (2019.01)

(58) Field of Classification Search
CPC ........ G06N 5/04; G06N 20/00; G06N 3/0481; G06N 3/084; G06N 5/022; G06N 3/0445;

(Continued)

(56) References Cited

U.S. PATENT DOCUMENTS 7,447,667 B2   11/2008   Gong et al.
8,645,287 B2   2/2014   Baker et al.
(Continued)

FOREIGN PATENT DOCUMENTS

CN   102124463 A   7/2011
WO   WO-2013010787 A1 *   1/2013   .............. G06F 17/11

OTHER PUBLICATIONS

"Explanations of Recommendations" Nava Tintarev University of Aberdeen Department of Computing Science Scotland, U.K., AB24 3UE (Year: 2007).*

(Continued)

*Primary Examiner* — Luis A Sitiriche

(57) ABSTRACT

A recommendation method includes determining one or more aspects of a first item based on at least one descriptive text of the first item. The recommendation method also includes updating a knowledge graph containing nodes that represent multiple items, multiple users, and multiple aspects. Updating the knowledge graph includes linking one or more nodes representing the one or more aspects of the first item to a node representing the first item with one or more first edges. Each of the one or more first edges identifies weights associated with (i) user sentiment about the associated aspect of the first item and (ii) an importance of the associated aspect to the first item. In addition, the recommendation method includes recommending a second item for a user with an explanation based on at least one aspect linked to the second item in the knowledge graph.

20 Claims, 25 Drawing Sheets

(58) Field of Classification Search
CPC .............. G06N 3/0454; G06N 3/0427; G06F 16/9024; G06F 16/337; G06Q 30/02
See application file for complete search history.

(56) References Cited

U.S. PATENT DOCUMENTS

| | | | |
|---|---|---|---|
| 9,195,945 B2 | 11/2015 | Liu et al. | |
| 9,824,152 B1 | 11/2017 | Feller et al. | |
| 2009/0089272 A1 | 4/2009 | Oliver et al. | |
| 2010/0042932 A1 | 2/2010 | Lehtiniemi et al. | |
| 2010/0161620 A1* | 6/2010 | Lamere ................ | G06F 16/636 707/E17.014 |
| 2010/0275128 A1* | 10/2010 | Ward ..................... | G06Q 10/10 715/744 |
| 2016/0042435 A1 | 2/2016 | Poon et al. | |
| 2016/0078111 A1* | 3/2016 | Schiff .................. | G06F 16/248 707/728 |
| 2016/0196491 A1* | 7/2016 | Chandrasekaran .... | G06N 20/00 706/50 |
| 2016/0259857 A1 | 9/2016 | Wang et al. | |
| 2016/0300292 A1 | 10/2016 | Shacham et al. | |
| 2017/0006356 A1* | 1/2017 | Krasadakis ......... | H04N 21/4532 |
| 2017/0091839 A1 | 3/2017 | Cunico et al. | |
| 2017/0103337 A1* | 4/2017 | Cao ........................... | G06N 3/08 |
| 2017/0220652 A1* | 8/2017 | Kazi ................. | G06F 16/24578 |
| 2018/0075483 A1 | 3/2018 | Boyarshinov | |
| 2018/0082183 A1* | 3/2018 | Hertz ....................... | G06N 5/00 |
| 2018/0129956 A1* | 5/2018 | Saxena ............... | G06F 21/6245 |
| 2018/0189634 A1* | 7/2018 | Abdelaziz ................ | G06N 3/04 |

OTHER PUBLICATIONS

Wikipedia, "Knowledge Graph," Jan. 13, 2019, 4 pages.
International Search Report dated Sep. 30, 2019 in connection with International Patent Application No. PCT/KR2019/007481, 3 pages.
Summons to attend oral proceedings pursuant to Rule 115(1) EPC dated Sep. 22, 2022 in connection with European Patent Application 19823313.2, 8 pages.
Office Action dated Oct. 12, 2023 in connection with Chinese Patent Application No. 201980040934.9, 27 pages.
Preliminary Opinion dated Sep. 20, 2023 in connection with European Patent Application No. 19823313.2, 8 pages.

* cited by examiner

We recommend Tampopo because the plot has 6 aspects in common with Big Night, which your rated 5 stars. Of your favorite movie aspects, the 3 most distinctive ones shared by the two movies are: Dinner, Company Ownership, and Foot Race.

Avengers: Infinity War (2018)
PG-13 | 2H 29Min
Action | Adventure | Fantasy | Sci-Fi Staring: Robert Downey Jr., Chris Hemsworth, Mark Ruffalo, Chris Evans
Director: Anthony Russo, Joe Russo

[Play On Netflix]  [Available On] ← 1702

Related Movies

Black Panther (2018)   Deadpool (2017)   Guardians Of The Galaxy 2 (2017)   Doctor Strange (2016)   Iron Man (2008)   Ant-Man (2015) ← 1704

Recommended Products

Appetite For Destruction In Music   The Queen Of The Damned In Books   The Complete C.S. Lewis Signature Classics In Books   Sty-HD 9 PCS Capacitive Stylus In Cell Phone Accessories   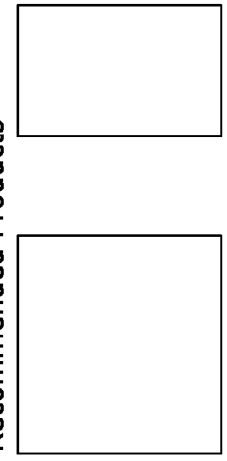 Dazz 3-Compartment Pop-Up Sorter In Home & Kitchen ← 1706

FIG. 17

SYSTEM AND METHOD FOR GENERATING ASPECT-ENHANCED EXPLAINABLE DESCRIPTION-BASED RECOMMENDATIONS

CROSS-REFERENCE TO RELATED APPLICATION AND PRIORITY CLAIM

This application claims priority under 35 U.S.C. § 119(e) to U.S. Provisional Patent Application No. 62/688,196 filed on Jun. 21, 2018, which is hereby incorporated by reference in its entirety.

TECHNICAL FIELD

This disclosure relates generally to recommendation systems. More specifically, this disclosure relates to a system and method for generating aspect-enhanced explainable description-based recommendations.

BACKGROUND

Consumer access to physical and digital products and services has increased dramatically over the last two decades. On one hand, this increase is very beneficial to consumers since consumers can now find more products and services that fit their interests or needs. On the other hand, this increasing complexity makes it very difficult for consumers to find the right products and services. Companies have tried to address this problem by providing product and service recommendations that are tailored to different consumers' preferences. These recommendation systems typically utilize information about the consumers and information about individual products and services to make recommendations. However, typical recommendation systems often fall short in a number of ways.

SUMMARY

This disclosure provides a system and method for generating aspect-enhanced explainable description-based recommendations.

In a first embodiment, a recommendation method includes determining one or more aspects of a first item based on at least one descriptive text of the first item. The recommendation method also includes updating a knowledge graph containing nodes that represent multiple items, multiple users, and multiple aspects. Updating the knowledge graph includes linking one or more nodes representing the one or more aspects of the first item to a node representing the first item with one or more first edges. Each of the one or more first edges identifies weights associated with (i) user sentiment about the associated aspect of the first item and (ii) an importance of the associated aspect to the first item. In addition, the recommendation method includes recommending a second item for a user with an explanation based on at least one aspect linked to the second item in the knowledge graph.

In a second embodiment, an electronic device includes at least one memory and at least one processor coupled to the at least one memory. The at least one processor is configured to determine one or more aspects of a first item based on at least one descriptive text of the first item. The at least one processor is also configured to update a knowledge graph containing nodes that represent multiple items, multiple users, and multiple aspects. To update the knowledge graph, the at least one processor is configured to link one or more nodes representing the one or more aspects of the first item to a node representing the first item with one or more first edges. Each of the one or more first edges identifies weights associated with (i) user sentiment about the associated aspect of the first item and (ii) an importance of the associated aspect to the first item. The at least one processor is further configured to recommend a second item for a user with an explanation based on at least one aspect linked to the second item in the knowledge graph.

In a third embodiment, a non-transitory computer readable medium contains computer readable program code that, when executed, causes an electronic device to determine one or more aspects of a first item based on at least one descriptive text of the first item. The medium also contains computer readable program code that, when executed, causes the electronic device to update a knowledge graph containing nodes that represent multiple items, multiple users, and multiple aspects. The computer readable program code that when executed causes the electronic device to update the knowledge graph includes computer readable program code that when executed causes the electronic device to link one or more nodes representing the one or more aspects of the first item to a node representing the first item with one or more first edges. Each of the one or more first edges identifies weights associated with (i) user sentiment about the associated aspect of the first item and (ii) an importance of the associated aspect to the first item. The medium further contains computer readable program code that, when executed, causes the electronic device to recommend a second item for a user with an explanation based on at least one aspect linked to the second item in the knowledge graph.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 12, 13, 14A, 14B, 15, 16, 17, and 18 illustrate example graphical user interfaces for providing recommendations to users in accordance with this disclosure;

DETAILED DESCRIPTION

Figure 1:
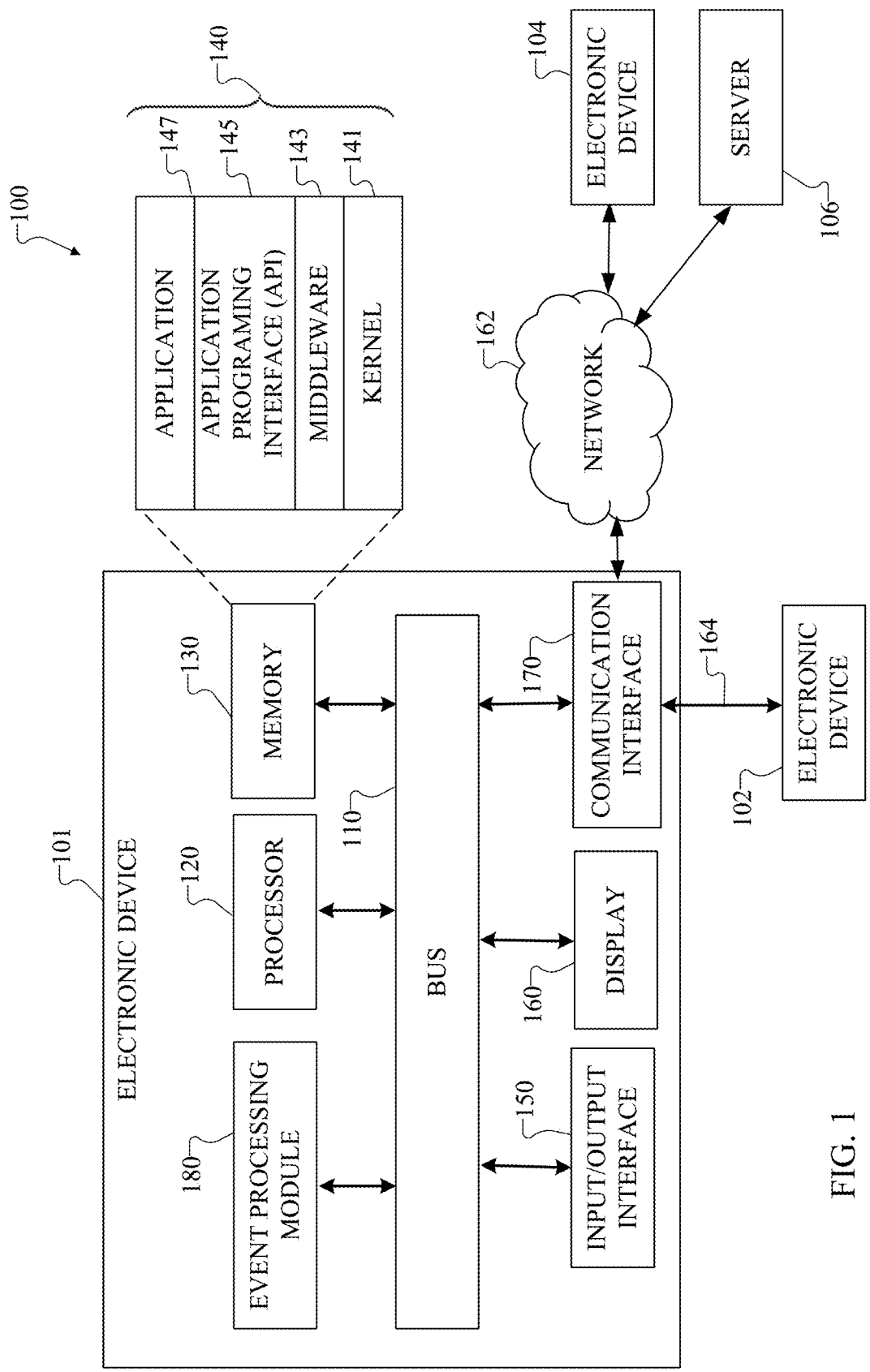
FIG. 1 illustrates an example network configuration in accordance with this disclosure.

FIGS. 1 through 20, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, consumer access to physical and digital products and services (referred to generally as "items") has increased dramatically. Companies have tried to provide item recommendations that are tailored to different consumers' preferences, which typically involves analyzing information about the consumers and information about individual items to make recommendations. However, typical recommendation systems often fall short in a number of ways. One important shortcoming of typical recommendation systems is that they do not provide recommendations that are accurate and explainable.

People often have very diverse and sometimes very specific interests. For example, a particular consumer may enjoy running, sightseeing, and specific types of movies (like ghost romances) that can influence what the particular consumer might buy in the future. Taking these types of fine-grained interests into account would allow a recommendation system to make more precise recommendations for the particular consumer. However, in many cases, a recommendation system merely identifies items that are recommended without any explanation or with very surface-level explanations. For instance, some recommendation systems simply indicate to a specific user that other users who liked, viewed, or purchased one item also liked, viewed, or purchased other items. Other recommendation systems simply identify items that are deemed "similar" (in some undefined way) to an item that a specific user liked, viewed, or purchased.

Users are often looking for something new that matches their long-term preferences, and they may be more willing to accept recommendations that provide detailed evidence showing how their preferences and requirements have been met and reject generic or unexplained recommendations. As an example, movie or television (TV) recommendation platforms and advertisement platforms often need to know the details about movies or TV shows, user preferences, and items in order to provide users with the details of how their preferences are met by items being advertised. The core businesses of some top-tier companies are fundamentally recommendation-based. For instance, NETFLIX and HULU provide recommendation capabilities that represent their primary value compared to simple on-demand streaming capabilities of many cable providers. One primary source of revenue for GOOGLE comes from advertisements that are powered by recommendation technology. AMAZON directly increases sales with recommended items, which also improves users' experiences and thus attracts new users.

The ability to make competitive recommendations often requires a large amount of data. Advertisers like GOOGLE and FACEBOOK have vast amounts of data over a wide array of domains to power recommendation algorithms for advertisement selection. This data can include direct user interactions with advertisements to measure the advertisements' efficiency. The ability of other companies to make recommendations can be much more limited, particularly when making recommendations across domains. For example, companies like NETFLIX and HULU have very rich data in a very narrow set of domains, such as movies and TV shows. It is therefore very difficult for these companies to make recommendations outside of the movie and TV show domains. One reason for the difficulties in making cross-domain recommendations is that certain companies may be unwilling to share some or all of their data regarding consumers. In some cases, even the types of data that are collected may be considered a trade secret and can be closely guarded. While a company might be willing to share summaries of its data in some cases, this can interfere with the use of so-called "deep learning" or other machine learning techniques, which often require the availability of detailed data.

This disclosure provides techniques to identify aspects of items from text-based descriptions associated with the items, extract subjective knowledge about the aspects of the items, determine how the aspects are related (possibly across different domains), and represent this information in a knowledge graph. This disclosure also provides techniques for using the knowledge graph to recommend items based on the aspects, determine how the aspects support the recommendations, show users how the aspects support the recommendations, and allow the users to browse the recommendations explicitly using the aspects. In some embodiments, the recommendations that are identified represent cross-provider recommendations (meaning the recommendations are made by one company for other companies' products or services) or cross-domain recommendations (meaning the recommendations are made by one company in one domain for products or services in other domains). This may allow users to engage in faceted browsing in which the users move between different domains when viewing item recommendations. Also, in some embodiments, the recommendations are identified while protecting the underlying data of the product or service providers. Particular examples of this functionality are described below involving the identification of aspects related to movies or TV shows and making recommendations for other movies or TV shows or for certain products. However, the techniques described in this patent document are not limited to these particular examples.

In this way, these techniques allow item recommendations to be provided to users more accurately and effectively. For example, the use of specific aspects of items can significantly improve the ability of a recommendation system in identifying recommended items, meaning users receive recommended items that are more specifically tailored to the users' preferences or interests. As a particular example, this can help to identify latent interests of users and provide recommended items related to those latent interests. Also, users often need reasons to accept recommendations, and shallow or unexplained reasons are much less convincing than deeper, well thought-out reasons. Providing aspects that one or more recommended items have in common with a specific item that a user liked, viewed, purchased, or otherwise used is much more informative and convincing that simply saying the one or more recommended items are "similar" to some other item. This becomes even more useful when making cross-domain recommendations since, without sufficient reasons, users are even less likely to believe that recommended items are tailored to fit their preferences or interests. Using aspect-based descriptions to support recommendations can significantly improve the performance of a recommendation system, and improved recommendations can improve overall user experiences and overall user satisfactions.

In addition, supporting aspect-based cross-domain recommendations allows multiple companies to form partnerships across their datasets without actually sharing their datasets. For example, AMAZON, Target, and Walmart could provide product embeddings from their knowledge graphs without revealing all of the information contained in their knowledge graphs. These embeddings may allow devices (such as televisions made by SAMSUNG, LG, SONY, or other companies or digital media players made by SAMSUNG, APPLE, ROKU, or other companies) or apps on these devices (such as apps from NETFLIX, HULU, or other companies) to recommend items from their partners based on users' movie and TV watching behaviors. The use of mimic networks as described below allows companies to represent their customers in a shared space without giving away the specifics of their customers' behaviors and without any overlapping users in their customer or item datasets.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
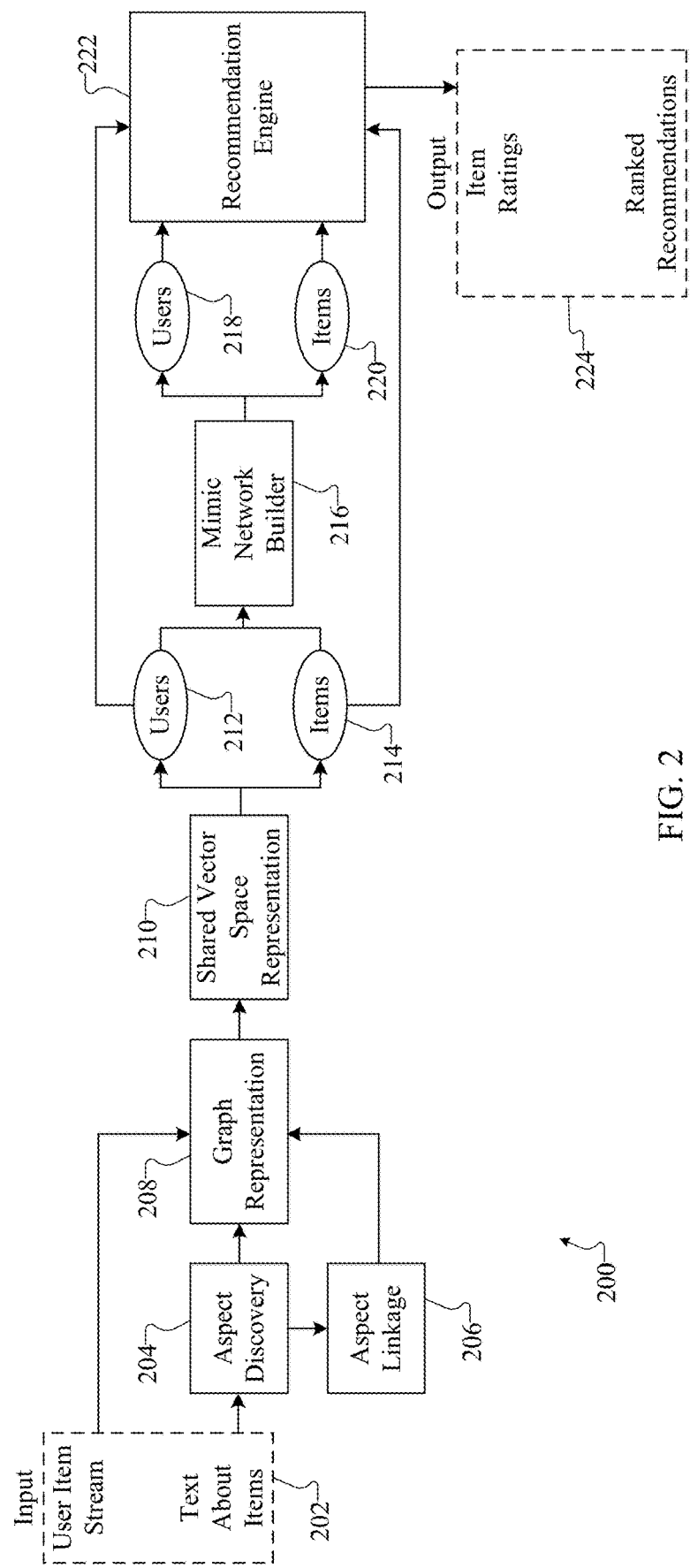
FIG. 2 illustrates an example architecture for setting up a recommendation system in accordance with this disclosure.

FIG. 2 illustrates an example architecture 200 for setting up a recommendation system in accordance with this disclosure. For ease of explanation, the architecture 200 of FIG. 2 may be implemented using an electronic device (such as any of the electronic devices 101, 102, 104 or the server 106) of FIG. 1. However, the architecture 200 could be implemented using any suitable electronic device(s) in any suitable system.

As shown in FIG. 2, the architecture 200 receives input data 202, which in this example includes at least one stream of information about users and items, as well as text about the items. For example, the input data 202 can include information identifying different users associated with a particular company and different items that are liked, purchased, viewed, reviewed, or otherwise used by or associated with the users in some manner. As another example, the input data 202 can include textual descriptions associated with movies, TV shows, music, or other digital content or associated with computers, TVs, stereos, handheld devices, refrigerators, washers, dryers, or other physical products. The text about the items can also or alternatively include user reviews associated with the items. As particular examples, in the context of movies or TV shows, the text about the items can include plot summaries or plot synopses associated with the movies or TV shows and/or user reviews of the movies or TV shows. The input data 202 can be obtained from any suitable source(s) of information. For instance, there are several sources of textual descriptions associated with movies and TV shows, such as IMDB.COM and MOVIELENS.ORG. There are also numerous sources of user reviews of movies and TV shows, such as AMAZON.

At least some of the input data 202 is provided to an aspect discovery function 204. An "aspect" generally refers to a coherent concept related to a type, feature, or other characteristic of an item. Some examples of aspects include the battery life, screen size, processor speed, hard drive capacity, or amount of memory for a smartphone, tablet computer, or laptop computer. Other examples of aspects include the softness or material of clothing; the picture quality, screen size, or resolution of a TV; how well a knife cuts; or the visual appeal of a car. Yet other examples of aspects include the scariness of a movie or TV show, the prettiness of scenery in a movie or TV show, the quality of the acting in a movie or TV show, the coherence of the plot in a movie or TV show, or the action scenes in a movie or TV show. Still other examples of aspects include the sweetness or smell of a wine or beer or how much foam a beer retains. People typically tend to hold opinions about aspects of items. An aspect can be important or unimportant to a person and can be significant or insignificant for an item. One aspect may be more or less important or unimportant to a person than another aspect. For example, the picture quality aspect of TVs may be more important to a particular person than the large screen size aspect of TVs.

The aspect discovery function 204 processes the received input data 202 in order to automatically identify different aspects of various items and to identify the significances of those aspects. For example, the aspect discovery function 204 can process item descriptions (such as product specifications) to identify characteristics of the items. The aspect discovery function 204 can also process user reviews of items to identify which characteristics of the items tend to be more or less important to users. This allows the aspect discovery function 204 to both identify the aspects of items and identify the relative importance or significances of those aspects.

The aspect discovery function 204 represents any suitable data mining algorithm or other algorithm that can process input data to identify aspects of items and the significances of those aspects. One example implementation of the aspect discovery function 204 is described below, although other implementations of the aspect discovery function 204 can be used. In some embodiments, the aspect discovery function 204 can be used to identify aspects of items without requiring the use of any "seed" words or prior knowledge about the domains, which can be useful in applications such as aspect-based advertising.

An aspect linkage function 206 processes the identified aspects in order to identify aspects that are related to one another. For example, the aspect linkage function 206 could be used to identify related aspects associated with different domains. As a particular example, the aspect linkage function 206 could process data and determine that nature documentaries are often associated with mountainous environments and that hiking boots are often used in rocky terrains, so these two aspects are related. The aspect linkage function 206 could therefore identify these aspects as being related, even though they reside in different domains. This may allow other components to make hiking boot recommendations to users who are interested in watching nature documentaries. The aspects that are related could be identified based at least partially on the aggregate of multiple users' preferences or interests regarding the aspects in dissimilar domains, which could be expressed in natural language format within the input data 202.

The aspect linkage function 206 represents any suitable algorithm that can process data to identify related aspects, including aspects in different domains. One example implementation of the aspect linkage function 206 is described below, although other implementations of the aspect linkage function 206 can be used.

A graph representation function 208 uses (among other things) the aspects identified by the aspect discovery function 204 and the relationships identified by the aspect linkage function 206 to generate or update one or more knowledge graphs. Knowledge graphs can be used to encode diverse knowledge about users, items, item aspects, item properties (which can be distinct from their aspects), and other information in order to make recommendations that are both accurate and potentially explainable. Knowledge graphs offer a convenient framework to capture relationships between users, items, aspects, item properties, and other information, making knowledge graphs very well-suited to perform hybrid-based recommendations that combine collaborative filtering (which models user interests on a population level) and content-based filtering (which models user interests in items based on similarities between items). Item properties can include things like an item's price or color.

The one or more knowledge graphs generally include nodes that represent the items, the identified aspects of those items, and the users. Edges are used to link associated nodes in the knowledge graph(s). For example, edges can be used to link nodes representing certain aspects to nodes representing the items having those aspects, thereby helping to associate the items with their aspects in the knowledge graph. Edges can also be used to link nodes representing certain items or aspects to nodes representing users having opinions about those items or aspects, thereby helping to associate user sentiments with the items or aspects. As described in more detail below, edges that link nodes representing aspects to other nodes (such as item and user nodes) in the knowledge graph can be associated with multiple weights. For instance, edges that connect nodes representing aspects and items can identify (i) users' sentiments about the associated aspects and (ii) the importance of the associated aspects to the items. Edges that connect nodes representing aspects or items and specific users can identify (i) those users' sentiments about the associated aspects or items and (ii) the importance of the aspects or items to the users. The use of multiple weights can help to improve "random walk" or other algorithms used to traverse the knowledge graph and learn information for use in making item recommendations.

The graph representation function 208 represents any suitable algorithm that can process data to generate knowledge graphs. One example implementation of the graph representation function 208 is described below, although other implementations of the graph representation function 208 can be used.

A shared vector space representation function 210 uses the one or more knowledge graphs generated by the graph representation function 208 to create a graph embedding within a shared vector space. For example, the shared vector space representation function 210 could traverse the knowledge graph and identify, for each node in the knowledge graph, the neighboring node or nodes. The shared vector space representation function 210 can then create a vector space identifying how the nodes in the knowledge graph are connected. In this way, the vector space identifies various users 212 and various items 214 contained in the knowledge graph while allowing some of the information in the knowledge graph to be concealed. The shared vector space representation function 210 represents any suitable algorithm that can generate vector spaces identifying users and items based on knowledge graphs.

A mimic network builder function 216 can be used to duplicate the shared vector space and to insert new users, items, aspects, or other information into the shared vector space. This allows the new users, items, aspects, or other information to be added to the vector space more rapidly, rather than requiring the new information to be added as new nodes to the knowledge graph and then rebuilding the vector space (although this could be done periodically or other any other suitable times). Again, the mimicked vector space identifies various users 218 and various items 220 while allowing some of the information in the knowledge graph to be concealed.

The shared vector space representation function 210 represents any suitable algorithm that can generate vector spaces identifying users and items based on knowledge graphs. In some embodiments, the mimic network builder function 216 uses deep learning to train a neural network, and the neural network processes information associated with users or items (and the items' aspects) in order to update the mimicked vector space. In particular embodiments, the mimic network builder function 216 uses one or more long short-term memories (LSTMs) and one or more convolutional neural networks (CNNs) to update the mimicked vector space. Periodic or other updates of the mimicked vector space can occur as new users, items, aspects, or other information is added.

A recommendation engine 222 receives inputs from the shared vector space or the mimicked vector space and generates recommendations for users based on the inputs. For example, the recommendation engine 222 can receive as inputs users 212, 218 paired with items 214, 220 in either of the vector spaces. The recommendation engine 222 processes this information to produce scores or other indicators identifying recommendations of one or more of the items for one or more of the users. As a particular example, because the identified aspects are linked to items and users in the knowledge graph, aspect-based connections can be modeled using deep learning or other machine learning technique to represent the aspect-based connections as fixed-size vectors of latent features. The recommendation engine 222 can then use a "but for" reasoning algorithm or other algorithm to determine which aspects would be influential in making recommendations for users. As described below, this allows the generation of natural-language explanations for recommendations using the aspects and permits aspect-based navigation of recommendations in a graphical user interface. Aspect-based navigation allows users to search or browse through items based on aspects, and recommended items can be personalized using the aspects. For instance, aspect-based recommendations can be used to create a personalized knowledge graph within a larger knowledge graph, where the personalized knowledge graph connects recommended items to other items using edges based on which aspects were used by the recommendation engine 222.

The recommendation engine 222 represents any suitable algorithm that can process data to generate recommendations based on aspects of items and associated user sentiment. One example implementation of the recommendation engine 222 is described below, although other implementations of the recommendation engine 222 can be used.

The recommendation engine 222 here operates to generate various output data 224, which in this example includes item ratings and ranked item recommendations. The ranked item recommendations can have any suitable form, such as when expressed as scores that associate different users with different items. In some embodiments, these scores can be computed in an offline or non-real-time manner and then provided to a placement engine (described below) for online use. Of course, the recommendation engine 222 could also generate item recommendations in a real-time manner.

Figure 3:
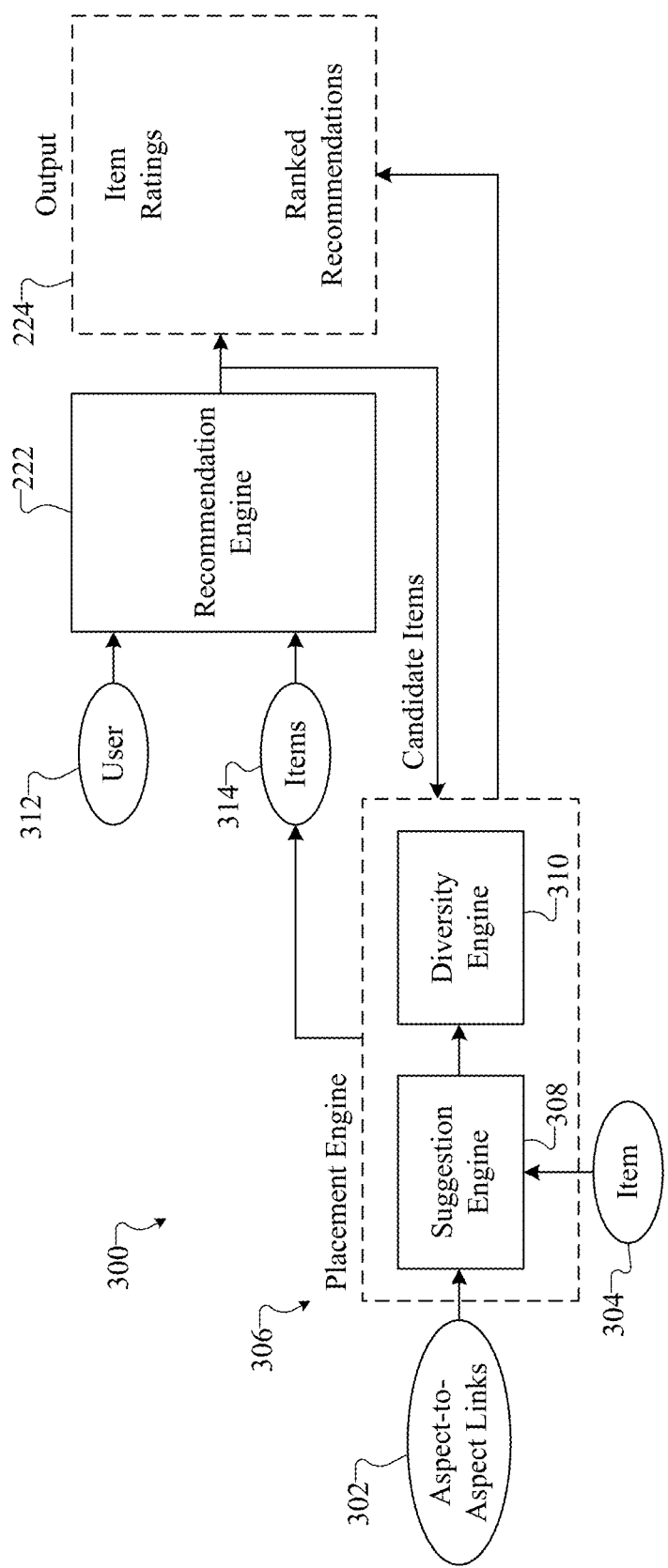
FIG. 3 illustrates an example architecture for operating a recommendation system in accordance with this disclosure.

FIG. 3 illustrates an example architecture 300 for operating a recommendation system in accordance with this disclosure. For ease of explanation, the architecture 300 of FIG. 3 may be implemented using an electronic device (such as any of the electronic devices 101, 102, 104 or the server 106) of FIG. 1. However, the architecture 300 could be implemented using any suitable electronic device(s) in any suitable system.

As shown in FIG. 3, various input data 302 and 304 is provided to a placement engine 306. In this example, the input data 302 includes aspect-to-aspect links, which identify links (edges) between different aspects in the knowledge graph. These links can be identified using outputs from the aspect linkage function 206, using the knowledge graph itself, using the shared vector space or mimicked vector space generated based on the knowledge graph, or in any other suitable manner. The input data 304 includes one or more items associated with a particular user, such as one or more items that the particular user currently or recently liked, purchased, viewed, reviewed, or otherwise used.

The placement engine 306 generally operates to identify recommendations for users and to rank the recommendations for each user in a suitable order. In this example, the placement engine 306 includes a suggestion engine 308 and a diversity engine 310. The suggestion engine 308 receives the input data 302 and 304 and generates a set of suggested items for a user. For example, the suggestion engine 308 can generate an initial list of suggested items for the user and then expand the list to include additional items. In some embodiments, the suggestion engine 308 can interact with the recommendation engine 222, which uses the identification of a particular user 312 and an identification of one or more items 314 to determine the particular user's preference for the identified items 314. The recommendation engine 222 can perform this function using the pre-computed data or in real-time. The diversity engine 310 determines the final ordering of recommended items for the user and helps to ensure that there is diversity (variety) in the items being recommended to the user if possible. For example, the diversity engine 310 can ensure that different items recommended to a user are associated with different aspects or different domains. The placement engine 306 can then generate a graphical user interface identifying the recommended items for the user or otherwise identify the recommended items to the user.

The suggestion engine 308 represents any suitable algorithm that can process data to identify suggested items for particular users. One example implementation of the suggestion engine 308 is described below, although other implementations of the suggestion engine 308 can be used. The diversity engine 310 represents any suitable algorithm that can process data to select suggested items for recommendation to particular users. One example implementation of the diversity engine 310 is also described below, although other implementations of the diversity engine 310 can be used.

Each of the functions 204-210, 216 and engines 222, 306-310 shown in FIGS. 2 and 3 can be implemented in at least one electronic device (such as any of the electronic devices 101, 102, 104 or the server 106) in any suitable manner. For example, in some embodiments, at least some of the functions and engines shown in FIGS. 2 and 3 can be implemented or supported using one or more software applications or other software instructions that are executed by the processor(s) 120 of the electronic device(s). In other embodiments, at least some of the functions and engines shown in FIGS. 2 and 3 can be implemented or supported using dedicated hardware components. In general, the functions and engines shown in FIGS. 2 and 3 can be performed using any suitable hardware or any suitable combination of hardware and software/firmware instructions.

Although FIG. 2 illustrates one example of an architecture 200 for setting up a recommendation system and FIG. 3 illustrates one example of an architecture 300 for operating a recommendation system, various changes may be made to FIGS. 2 and 3. For example, various components in FIGS. 2 and 3 could be combined, further subdivided, rearranged, or omitted and additional components could be added according to particular needs. As a particular example, there may be no need to use a mimic network, in which case the shared vector space generated by the shared vector space representation function 210 can be updated and used by subsequent components.

Figure 4:
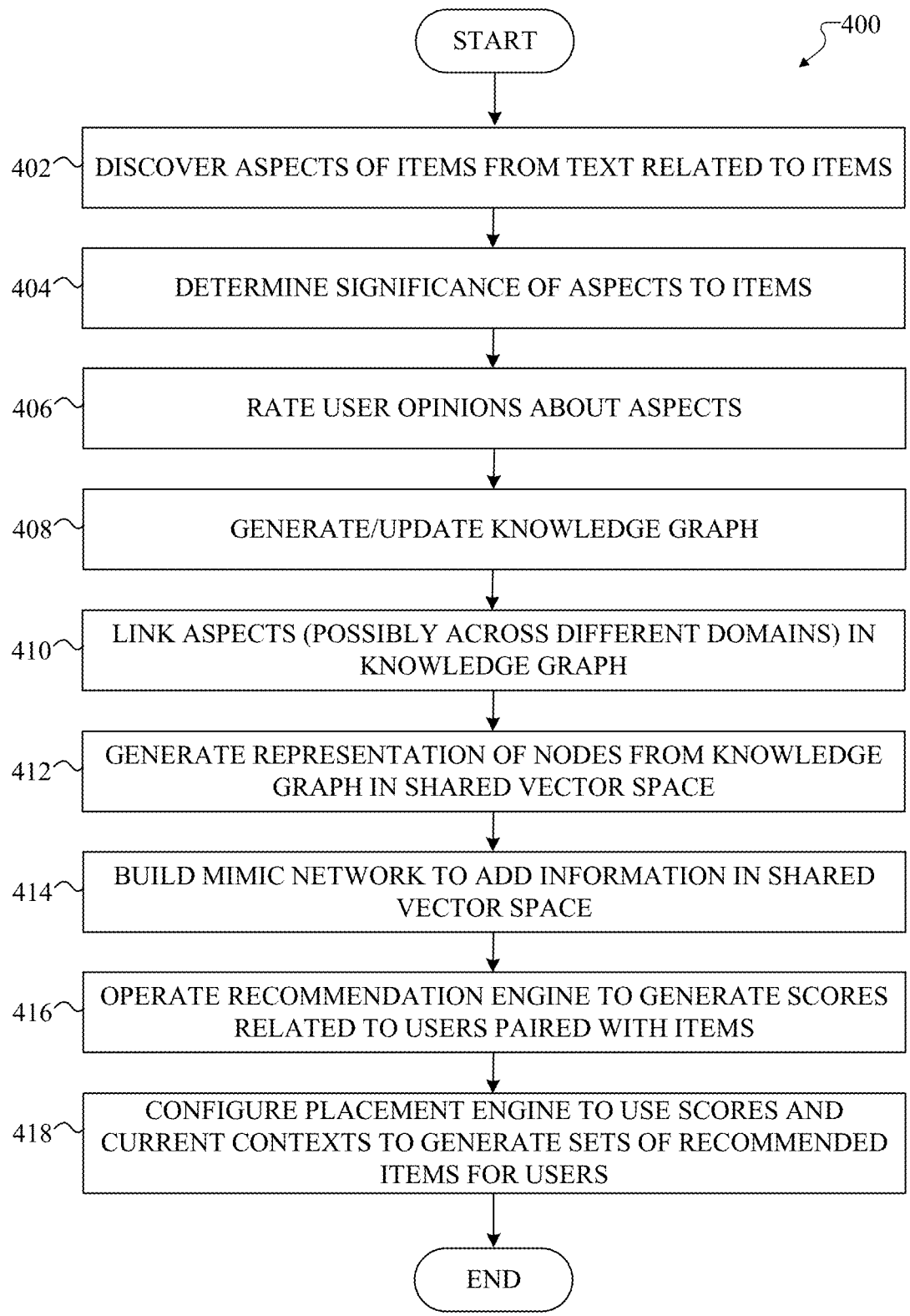
FIG. 4 illustrates an example method for setting up a recommendation system in accordance with this disclosure.

FIG. 4 illustrates an example method 400 for setting up a recommendation system in accordance with this disclosure. For ease of explanation, the method 400 of FIG. 4 may be implemented using an electronic device (such as any of the electronic devices 101, 102, 104 or the server 106) of FIG. 1 to support the use of the architecture 200 shown in FIG. 2. However, the method 400 could be implemented using any suitable electronic device(s) in any suitable system.

As shown in FIG. 4, aspects of items are discovered using text related to the items at step 402, the significance of the aspects to the items are determined at step 404, and user opinions of the aspects are rated at step 406. This could include, for example, the processor 120 of the electronic device executing the aspect discovery function 204 to conduct data mining or other operations using available input data 202. In some cases, the significance of the aspects to the items and the user opinions of the aspects can be determined by processing item reviews, product guides, or other suitable input data 202.

A knowledge graph is generated or updated using this information at step 408. This could include, for example, the processor 120 of the electronic device executing the graph representation function 208 to generate or update at least one knowledge graph. As particular examples, the graph representation function 208 could generate a node in the knowledge graph for each item (if the item does not already have a corresponding node in the knowledge graph) and generate a node in the knowledge graph for each identified aspect (if the aspect does not already have a corresponding node in the knowledge graph). The graph representation function 208 could also generate edges that link nodes representing the aspects to nodes representing the items having those aspects. As described below, these edges can have multiple weights associated with (i) user sentiment about the aspects and (ii) an importance of each aspect to the associated item(s). The graph representation function 208 could further generate edges that link nodes representing the aspects to nodes representing users who have known sentiments about those aspects. As described below, these edges can have multiple weights associated with (i) user sentiment about the associated aspects and (ii) an importance of each associated aspect to the associated user.

Aspects are linked, possibly across different domains, in the knowledge graph at step 410. This could include, for example, the processor 120 of the electronic device executing the aspect linkage function 206 to identify aspects that might be related. In some embodiments, aspects could be defined as being related when multiple users mention the same aspects in the different domains. This could also include the processor 120 of the electronic device executing the graph representation function 208 to add additional edges to the knowledge graph linking the related aspects.

A representation of the nodes in the knowledge graph is generated in a shared vector space at step 412. This could include, for example, the processor 120 of the electronic device executing the shared vector space representation function 210 to identify the nodes and the connections (edges) between the nodes and to represent this information in a vector space. As a particular example, the shared vector space representation function 210 could identify the neighboring node or nodes for each node in the knowledge graph and create a vector space identifying how the nodes in the knowledge graph are connected. A mimic network can be built to allow new information (such as new users, items, or aspects) to be added to the vector space at step 414. This could include, for example, the processor 120 of the electronic device executing the mimic network builder function 216 to generate the mimic network. Again, this can be done to help hide information in the knowledge graph from outside parties, which may be necessary or desirable in some circumstances.

A recommendation engine is operated to generate scores related to users paired with items at step 416. This could include, for example, the processor 120 of the electronic device executing the recommendation engine 222 to receive inputs that include users 212, 218 and items 214, 220 and to generate a score indicating the level to which the item in each pair would be recommended for the user in that pair. A placement engine is configured to use the scores and other information (such as current user contexts) to generate sets of recommended items for different users at step 418. This could include, for example, the processor 120 of the electronic device executing the recommendation engine 222 to provide the output data 224 to the placement engine 306.

Figure 5:
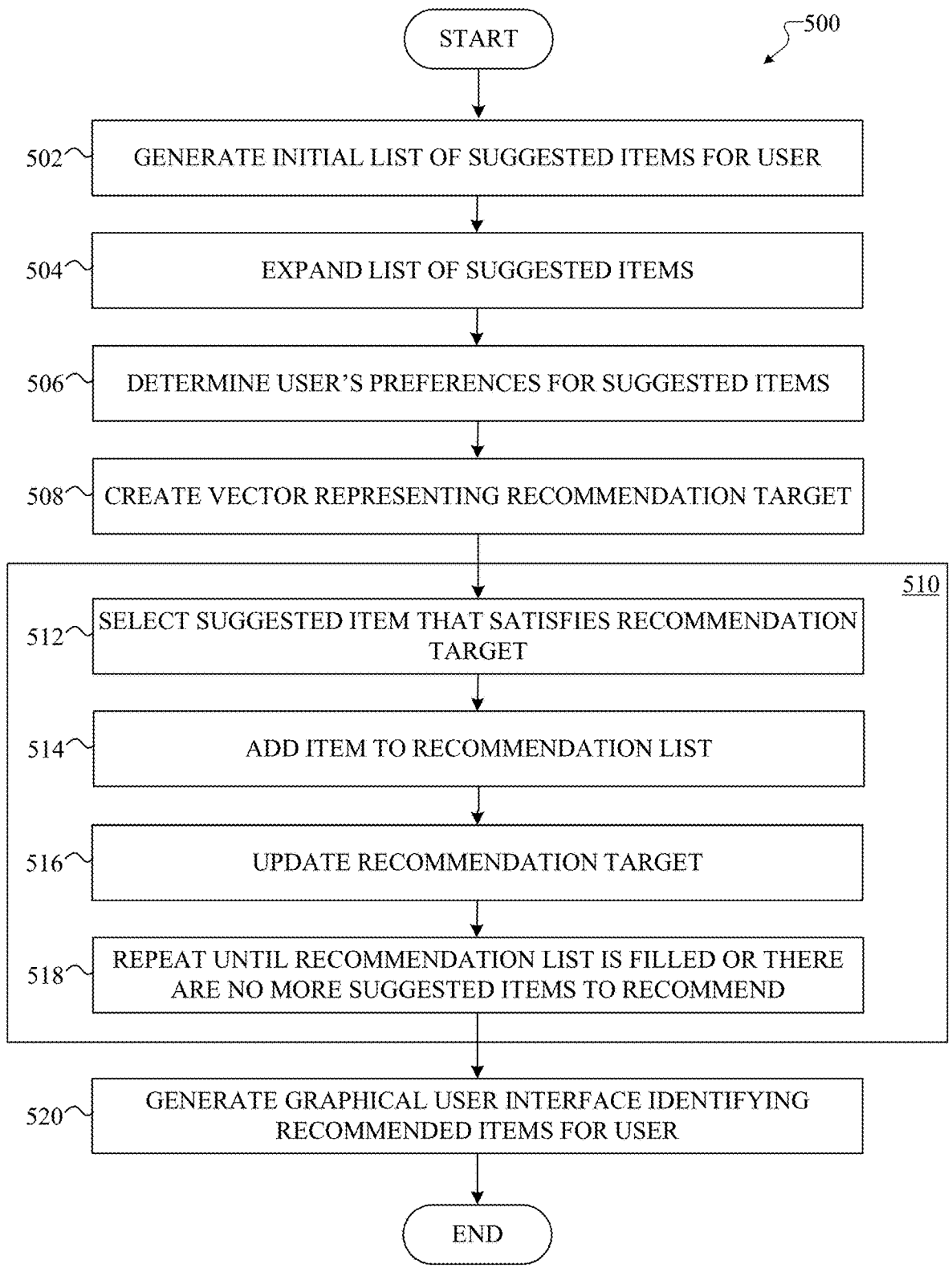
FIG. 5 illustrates an example method for operating a recommendation system in accordance with this disclosure.

FIG. 5 illustrates an example method 500 for operating a recommendation system in accordance with this disclosure. For ease of explanation, the method 500 of FIG. 5 may be implemented using an electronic device (such as any of the electronic devices 101, 102, 104 or the server 106) of FIG. 1 to support the use of the architecture 300 shown in FIG. 3. However, the method 500 could be implemented using any suitable electronic device(s) in any suitable system.

As shown in FIG. 5, an initial list of suggested items for a particular user is generated at step 502, and the list can be expanded to include additional suggested items at step 504. This could include, for example, the processor 120 of the electronic device executing the suggestion engine 308 to generate an initial list of suggested items for the user based on known good items (such as items that the user has a history of liking) or high-scoring recommended items (such as items selected based on the output data 224). This could also include the suggestion engine 308 expanding the initial list (using the initial list or items in the current user context as defined by the input data 304) to suggest additional items. The additional items can be selected in various ways, such as when the additional items are similar in the shared vector space to items already in the list of suggested items, are similar because they have similar aspects to items already in the list of suggested items, or are similar because they have linked aspects with items already in the list of suggested items.

The user's preferences for the suggested items in the list are determined at step 506. This could include, for example, the processor 120 of the electronic device executing the suggestion engine 308 to interact with the recommendation engine 222 or use previously-generated output data 224 from the recommendation engine 222 to identify which suggested items in the list might be acceptable to the particular user. A vector representing a recommendation target is created at step 508. This could include, for example, the processor 120 of the electronic device executing the diversity engine 310 to generate a recommendation target that represents a set of features in the vector space or aspects of items that should be recommended to the particular user. The recommendation target can be based on the user's preferences.

Item recommendations are generated at step 510. In this example, this includes selecting a suggested item from the initial or expanded list of suggested items having features or aspects that satisfy the recommendation target at step 512. This could include, for example, the processor 120 of the electronic device executing the diversity engine 310 to select an item from the suggestion list that matches the recommendation target and has an acceptable recommendation score. This also includes adding the selected item to a recommendation list at step 514. This could include, for example, the processor 120 of the electronic device executing the diversity engine 310 to add the selected item to the particular user's recommendation list. This could also include the diversity engine 310 placing the selected item in the user's recommendation list in a specified position or ranking with respect to other items already in the user's recommendation list, such as in order of decreasing score as defined by the recommendation engine 222. This further includes updating the recommendation target at step 516. This could include, for example, the processor 120 of the electronic device executing the diversity engine 310 to update the recommendation target so that the recommendation target represents a different set of features in the vector space or aspects of items that should be recommended to the particular user. This can help to ensure that different items or different types of items are recommended to the user. At step 518, the selecting, adding, and updating steps can be repeated one or more times until an adequate number of item recommendations are identified or until there are no more items in the suggestion list to process.

There are various ways in which a recommendation target can be generated, and the following represents several example non-limiting techniques for generating a recommendation target. In context-insensitive embodiments, the recommendation target could represent the user's vector in the vector space, or the recommendation target could represent a combination of aspects that the user likes or otherwise has a positive sentiment about. In context-sensitive embodiments, a currently-highlighted item can be used as additional information (in addition to the user's vector in the vector space or a combination of aspects) to generate a recommendation target. In a movie or TV show recommendation system, for instance, the recommendation target can be created based on a currently-highlighted movie or TV show in a graphical user interface. In a product recommendation system, aspect links can extend from a currently-highlighted movie or TV show to other product domains, and each link can be assigned a weight (such as by multiplying the popularity of the movie or TV show's aspect with the strength of the aspect link to the other domain). These values could be normalized so that each product domain receives an equal weight in order to prevent the recommendation target from focusing only on the closest domain to movies and TV shows. Also, in some embodiments, the recommendation engine 222 can be used to select a recommended item and target similar items, which may or may not involve restricting the domain(s) of the similar items. Further, in some embodiments, specific aspects of items are targeted, such as by selecting aspects using their vectors in the shared vector space. In these embodiments, when selecting multiple aspects, their vectors can be combined, such as by using a weighted combination (via vector multiplication and addition).

A graphical user interface identifying the recommended items is generated at step 520. This could include, for example, the processor 120 of the electronic device executing the placement engine 306 or other logic to identify the recommended items. Example user interfaces are described below, although any other suitable user interfaces could be used here.

Although FIG. 4 illustrates one example of a method 400 for setting up a recommendation system and FIG. 5 illustrates one example of a method 500 for operating a recommendation system, various changes may be made to FIGS. 4 and 5. For example, while shown as a series of steps in each figure, various steps in FIGS. 4 and 5 could overlap, occur in parallel, occur in a different order, or occur any number of times. Also, various steps can be omitted, such as when there is no need to use a mimic network.

Figure 6:
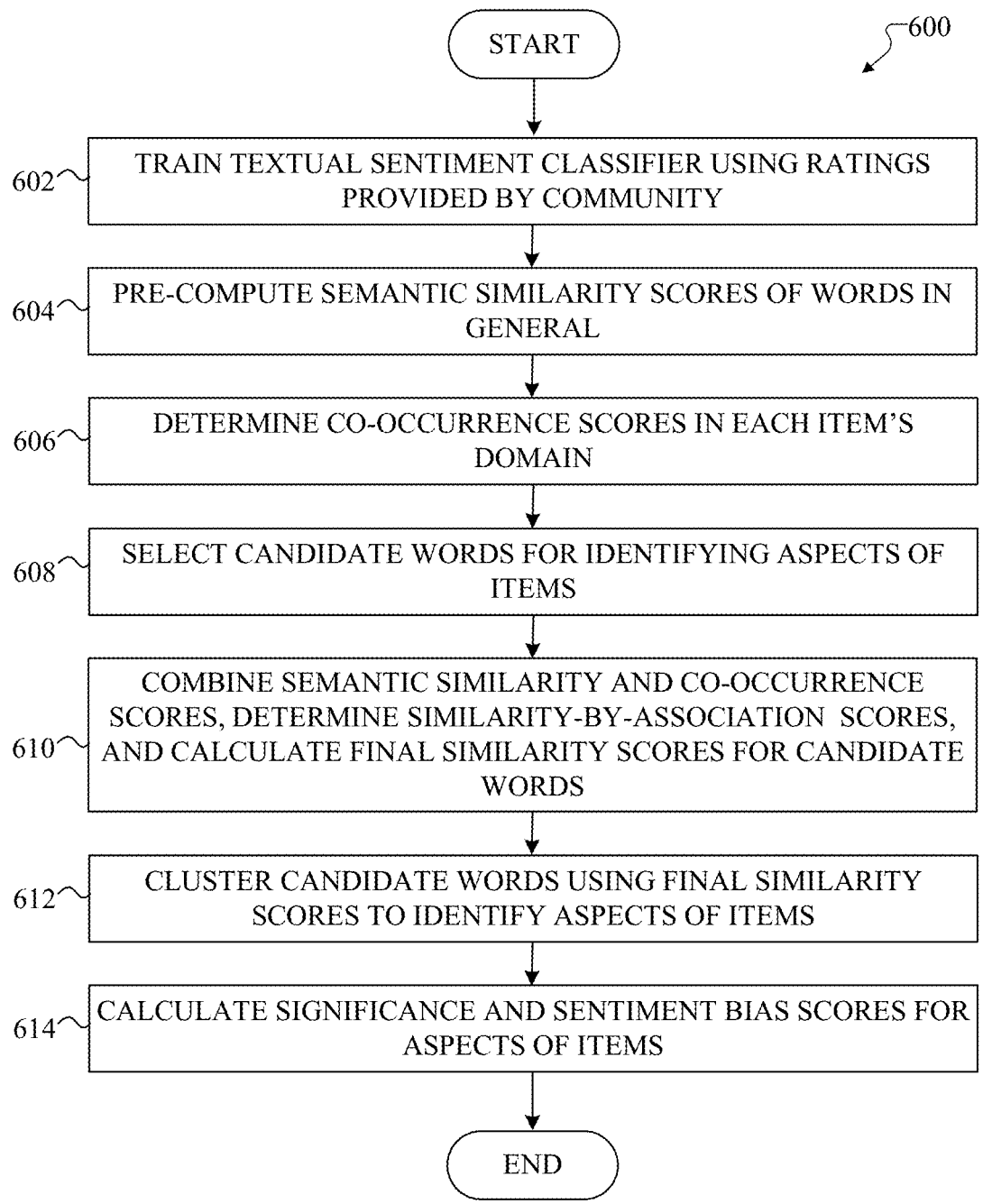
FIG. 6 illustrates an example method for discovering aspects of items and determining significances of those aspects in accordance with this disclosure.

FIG. 6 illustrates an example method 600 for discovering aspects of items and determining significances of those aspects in accordance with this disclosure. The method 600 could, for example, be performed as part of steps 402, 404, and 406 in the method 400 of FIG. 4. For ease of explanation, the method 600 of FIG. 6 may be implemented using an electronic device (such as any of the electronic devices 101, 102, 104 or the server 106) of FIG. 1 to support the use of the aspect discovery function 204 in the architecture 200 shown in FIG. 2. However, the method 600 could be implemented using any suitable electronic device(s) in any suitable system.

As shown in FIG. 6, a textual sentiment classifier is trained using ratings provided by a community at step 602. This could include, for example, the processor 120 of the electronic device executing a sentiment analysis or opinion mining algorithm as part of the aspect discovery function 204 to extract data from item specifications, user reviews, or other input data 202 associated with items. As noted above, in the context of movies or TV shows, the text that can be analyzed may include plot summaries or plot synopses associated with the movies or TV shows and/or user reviews of the movies or TV shows.

Semantic similarity scores for various words in general are pre-computed or otherwise identified at step 604. This could include, for example, the processor 120 of the electronic device executing the aspect discovery function 204 to identify the semantic similarity scores for various pairs of words based on word embeddings or latent semantic analysis from a general corpus, such as WIKIPEDIA or other corpus. This could also or alternatively include the processor 120 of the electronic device executing the aspect discovery function 204 to identify the semantic similarity scores for various pairs of words based on semantic relations in WordNet (which represents a lexical database for the English language). However, any other suitable approach could also be used here. It should be noted that different semantic similarity scores can be obtained for the same two words based on the order of the words. Stated another way, the semantic similarity score from word A to word B may be different than the semantic similarity score from word B to word A.

Co-occurrence scores are determined for each item's domain at step 606. This could include, for example, the processor 120 of the electronic device executing the aspect discovery function 204 to identify how often certain words or phrases appear in textual documentation associated with different domains or different texts for each item. Candidate words that could potentially be used to identify different aspects of the items are selected at step 608. This could include, for example, the processor 120 of the electronic device executing the aspect discovery function 204 to identify the most frequently used words in each item's domain. These could represent the most frequently used words that satisfy a set of rules based on the words' part-of-speech tags and a dependency parse for a small sub-sample of the dataset that uses these words. This can help to ensure that the selected words are actually being used to describe aspects of the items and are not merely superfluous words in the text related to the items.

The semantic similarity scores and the co-occurrence scores for the candidate words are combined, similarity-by-association scores for the candidate words are calculated, and final similarity scores for the candidate words at calculated by step 610. This could include, for example, the processor 120 of the electronic device executing the aspect discovery function 204 to combine the semantic similarity scores and the co-occurrence scores in some manner for various pairs of candidate words. In some embodiments, this can occur in a vector space, where each candidate word is associated with a dimension in the vector space. Each candidate word could then be represented as multiple vectors in the vector space, where one vector is used for each type of information to be combined.

In particular embodiments, the semantic similarity scores for word A to all other words C are represented in a vector $\vec{A_s}$. This can be accomplished by setting each component of the vector $\vec{A_s}$ to the semantic similarity score of word A to one of the words C. Also, a vector $\vec{A_d}$ can be created representing the co-occurrence-based similarity of word A to all other words C using the co-occurrence scores of word A to the words C. In some instances, the Normalized Pointwise Mutual Information score of word A with each word C in the input text collection can be used to compute the co-occurrence-based similarity score for that pair of words in the vector $\vec{A_d}$. The semantic similarity scores can be combined with the co-occurrence-based similarity scores while calculating a similarity-by-association score SBA from candidate word A to candidate word B as follows:

$$SBA(A, B) = \frac{(\vec{A_s}\vec{B_d}) + (\vec{A_d}\vec{B_s})}{|\vec{A_s}| + |\vec{B_s}|} \quad (1)$$

Since the vector multiplications in Equation (1) use both semantic similarity vectors and co-occurrence similarity vectors, they involve an element-wise combination of the semantic similarity scores with the co-occurrence scores. Since the vector multiplications use vectors for different words and the vectors share the same dimensions, they create a similarity-by-association score between words A and B. This follows the general form of an association similarity score, which could be expressed as follows:

$$SBA(A,B)=\Sigma_c f(\text{Sim}(A,C),\text{Sim}(B,C)) \quad (2)$$

Here, SBA(A, B) represents the similarity-by-association score for a pair of candidate words A and B, and C represents each of the remaining words in the set of candidate words (excluding words A and B). Also, Sim(A, C) and Sim(B, C) represent the final similarity scores for words A and C and words B and C. This effectively measures how similar words A and B are compared to every other candidate word C.

In some embodiments, the final similarity score for each pair of candidate words can be defined as the smaller of (i) semantic similarity score and (ii) similarity-by-association score in Equation (1). The larger of the two semantic similarity scores for the pair of candidate words could be used here, since the semantic similarity scores are not symmetric (meaning the semantic similarity scores can differ based on the order of the words). However, any other suitable approach could also be used here.

The candidate words are clustered according to their final similarity scores at step 612. This could include, for example, the processor 120 of the electronic device executing the aspect discovery function 204 to group the candidate words in the set of candidate words into different groups, where each group includes candidate words having the same or similar final similarity scores. Each of the groups is said to represent a different aspect of one or more items.

Significance and sentiment bias scores are identified for the identified aspects of the items at step 614. This could include, for example, the processor 120 of the electronic device executing the aspect discovery function 204 to use the textual sentiment classifier with any mentions of the groups of candidate words (the aspects) in the input data 202. In some embodiments, this can include the processor 120 of the electronic device determining the user sentiment associated with each item aspect using a pre-trained sentiment model. For instance, the number of times that an aspect occurs in a positive or negative sentiment sentence can be counted. Given a user's review for an item, the user's sentimental association to an aspect for the item can be determined by the percentage of positive sentences versus negative sentences that the user writes with the aspect. These scores can be aggregated for the item to determine what percentage of users find each aspect positive for the item. Similarly, these scores can be aggregated to determine user sentiment about that aspect in general.

In some embodiments, the sentiment model can be trained using a Topic Independence Scoring Algorithm (TISA). TISA produces a "bag of words" style text classifier. In a bag of words text classifier, a span of text is represented as a vector in a vector space, where the count of each word (or each short sequence of words) is represented as a dimension. For instance, sequences of one or two words can be used as dimensions. Longer sequences are possible, are more informative, and are less likely to have their sentiment negated by a simple "not," but longer sequences tend to occur less often (making them less useful with a higher variance). The trained model can have a set of weights for each word/dimension. The corresponding weights are multiplied together, the results are summed, and the final score is used to decide the sentiment of the span of text. TISA is designed to put strong positive weights on words with positive sentiment in many different topic areas. TISA thus favors generic sentiment expressions that are unlikely to be aspect-indicator words themselves. Consider the following example sentences:

1. I like how comfortable the clothing is.
2. I like how small the smart phone is.
3. I like how big the TV set is.

All three sentences are positive about an aspect of an item. The generic expression of sentiment captured by the word sequences in "I like how" is the primary factor causing the TISA model to identify the correct sentiment. This reduces the tendency to assign the opposite sentiment to an aspect of an item that is better or worse than the normal sentiment about that aspect in the topic area. As a particular example, consider the size aspect of an electronic product. Discussions about the size of an electronic product can be indicated by words such as "size," "small," "big," "large," "larger," "smaller," "smallest," "tiny," and "huge." More reviews with sentences that use these words indicate that the aspect is more important to users and that product.

Some aspect-indicator words may indicate a sentiment about the aspect in a given area, but these sentiments may vary between different topic areas as illustrated in the second and third example sentences above. Calculating the similarity-by-association scores above is therefore useful because some aspect-indicator words tend to occur in similar (sometimes even interchangeable) contexts. For example, consider the following sentences:

1. My new smart phone is smaller than the last one.
2. My new TV is larger than the last one.

This helps to group aspect terms that are direct opposites into the same aspect group. The semantic similarity is also important because some aspect-indicator words tend not to occur in similar contexts. For instance, consider the following sentences:

1. I got it at a great price.
2. It was just too expensive.

Swapping the terms "price" and "expensive" will not sound reasonable as can be seen here.

1. I got it at a great expensive.
2. It was just too price.

This is frequently the case when the aspect words have a different part of speech. It also occurs frequently when one term is an explicit reference to the aspect (price) and the other term implicitly references the aspect while also indicating sentiment about the aspect (expensive).

Although FIG. 6 illustrates one example of a method 600 for discovering aspects of items and determining significances of those aspects, various changes may be made to FIG. 6. For example, while shown as a series of steps, various steps in FIG. 6 could overlap, occur in parallel, occur in a different order, or occur any number of times. Also, FIG. 6 illustrates one example way in which data can be processed to identify aspects of items, the significance of those aspects, and user sentiment of those aspects. Any other suitable data mining technique or other technique could also be used here.

Figure 7:
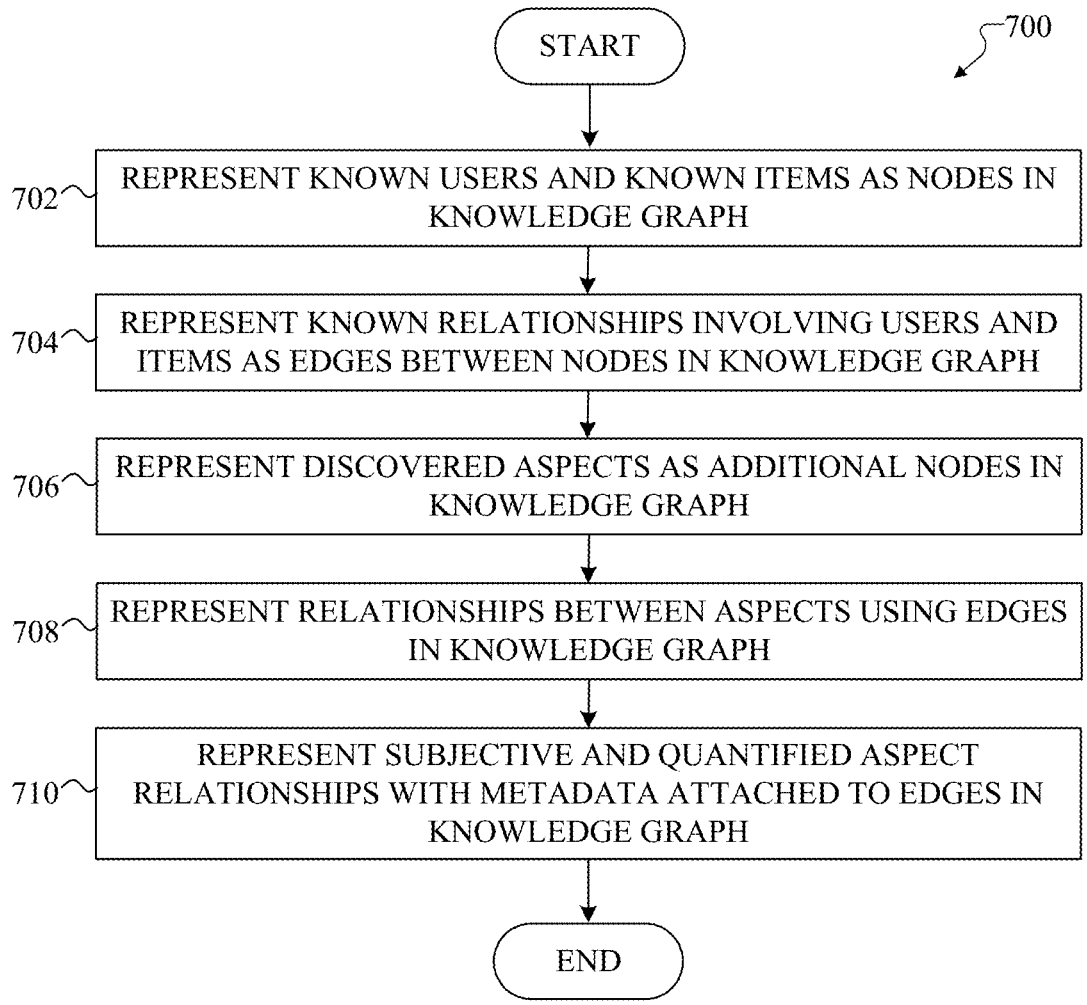
FIG. 7 illustrates an example method for generating or updating a knowledge graph in accordance with this disclosure.

FIG. 7 illustrates an example method 700 for generating or updating a knowledge graph in accordance with this disclosure. The method 700 could, for example, be performed as part of step 408 in the method 400 of FIG. 4. For ease of explanation, the method 700 of FIG. 7 may be implemented using an electronic device (such as any of the electronic devices 101, 102, 104 or the server 106) of FIG. 1 to support the use of the graph representation function 208 in the architecture 200 shown in FIG. 2. However, the method 700 could be implemented using any suitable electronic device(s) in any suitable system.

As shown in FIG. 7, known users and known items are represented as nodes in the knowledge graph at step 702. This could include, for example, the processor 120 of the electronic device executing the graph representation function 208 to add a node to the knowledge graph for each user or item not already identified in the knowledge graph. This could also include the processor 120 of the electronic device executing the graph representation function 208 to add nodes representing properties of the items. As a particular example, the items could represent movies or TV shows, and nodes could be inserted into the knowledge graph representing the movies or TV shows and properties of the movies or TV shows (such as actors and actresses in the movies or TV shows and directors, producers, writers, cinematographers, or other personnel associated with the movies or TV shows). As another particular example, the items could represent products that might be recommended to users, and nodes could be inserted into the knowledge graph representing the products and properties of the products (such as prices, manufacturers, and colors).

Known relationships involving the users and the items are represented as edges between the nodes at step 704. This could include, for example, the processor 120 of the electronic device executing the graph representation function 208 to add edges connecting the nodes representing the items to the nodes representing the item properties. As a particular example, this could include connecting the nodes representing the actors, actresses, directors, producers, writers, cinematographers, or other personnel with the nodes representing the movies and TV shows. As another particular example, this could include connecting the nodes representing the prices, manufacturers, and colors with the nodes representing the products. In addition, this could include the processor 120 of the electronic device executing the graph representation function 208 to add edges connecting the nodes representing the users and the nodes representing the items that the users have liked, purchased, viewed, reviewed, or otherwise used or been associated with in some manner.

Discovered aspects of the items are represented in the knowledge graph using additional nodes at step 706. This could include, for example, the processor 120 of the electronic device executing the graph representation function 208 to add nodes representing new aspects (such as those identified by different candidate word clusters mentioned earlier) into the knowledge graph. In some cases, multiple hierarchical aspects could be associated with at least some of the items. For instance, products could be associated with multiple levels of categorization, such as when products are placed into broad categories that are then further subdivided into more granular sub-categories. As a particular example, there could be a broad classification for movies and TV shows, then movie and TV show sub-classes, and then even more granular genre sub-classes. Note, however, that this is not required.

Relationships between aspects are represented using additional edges in the knowledge graph at step 708. This could include, for example, the processor 120 of the electronic device executing the graph representation function 208 to add edges between related aspects (possibly across domains) as determined by the aspect linkage function 206. In some embodiments, aspects that are related could represent aspects associated with the category or sub-category classifications in which different items are located, although as noted above there are other ways of arranging items.

Subjective and quantified aspect relationships are represented using non-graph metadata attached to edges in the knowledge graph at step 710. The subjective and quantified aspect relationships can be expressed as weights that are attached to the edges linking aspect nodes in the knowledge graph to other nodes. For example, aspects can be related to items or users by both (i) user sentiments about the aspects and (ii) the importance of the aspects to the items or the users. These relations can be quantified, but such quantification is difficult to represent and use with a conventional knowledge graph. In accordance with this disclosure, two weights can be assigned to each edge coupling a node representing an aspect to a node representing an item or a user. The two weights represent the sentiment and the importance of the aspect, either to a user or to an item. In some cases, the weights can be stored as key value pairs. In effect, the edges involving nodes representing aspects in the knowledge graph represent augmented edges that contain (i) information related to the opinions that people hold about the aspects, which can be obtained from reviews or other documentation and (ii) information about how important the aspects are to the items or users. As a simplified example, people may hate the opening introduction (one aspect) of a TV show, but this is a relatively unimportant aspect of the TV show. The weighting of the edges in the knowledge graph can be used to help represent both the user sentiment about different aspects and the importance of those aspects.

Although FIG. 7 illustrates one example of a method 700 for generating or updating a knowledge graph, various changes may be made to FIG. 7. For example, while shown as a series of steps, various steps in FIG. 7 could overlap, occur in parallel, occur in a different order, or occur any number of times. Also, FIG. 7 illustrates one example way in which data can be processed to generate or update a knowledge graph. Any other suitable technique could also be used here.

Figure 8:
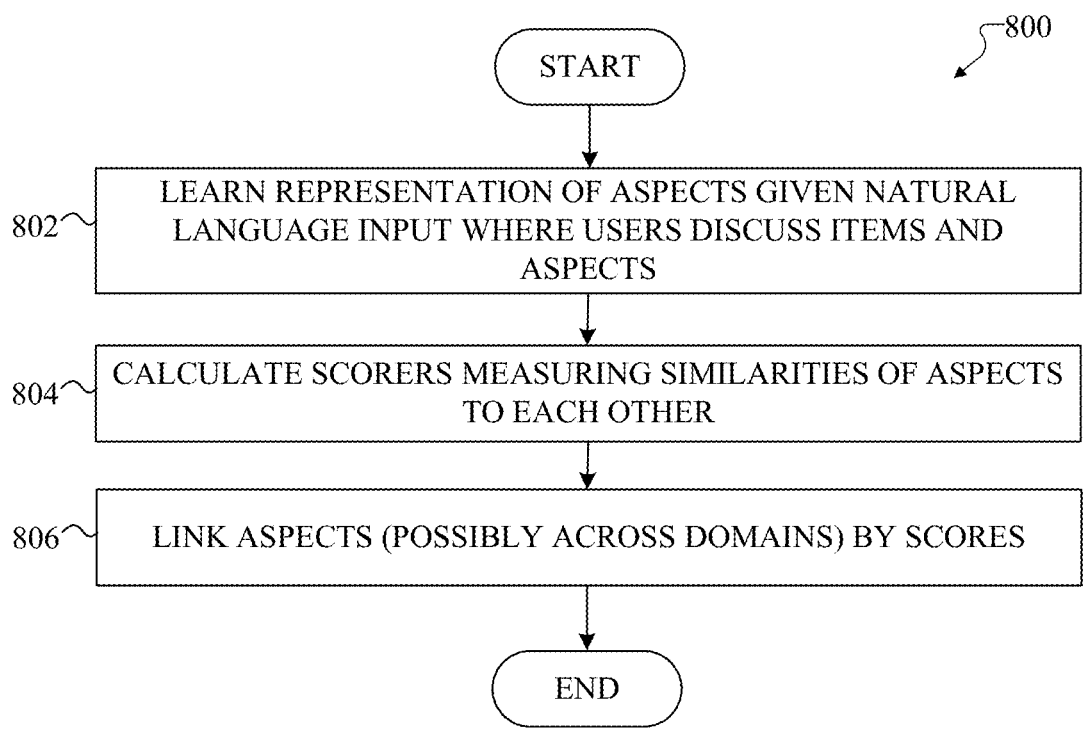
FIG. 8 illustrates an example method for linking aspects of items, possibly across domains, in accordance with this disclosure.

FIG. 8 illustrates an example method 800 for linking aspects of items, possibly across domains, in accordance with this disclosure. The method 800 could, for example, be performed as part of step 410 in the method 400 of FIG. 4. For ease of explanation, the method 800 of FIG. 8 may be implemented using an electronic device (such as any of the electronic devices 101, 102, 104 or the server 106) of FIG. 1 to support the use of the aspect linkage function 206 in the architecture 200 shown in FIG. 2. However, the method 800 could be implemented using any suitable electronic device(s) in any suitable system.

As shown in FIG. 8, a representation of the aspects is learned given natural language input at step 802. This could include, for example, the processor 120 of the electronic device executing the aspect linkage function 206 to analyze the input data 202 where users discuss particular items and aspects of those items. In some embodiments, the total number of mentions of each aspect at the sentence level can be determined. In other embodiments, deep learning can process aspect embeddings taken from an initial version of a knowledge graph where there are no aspect-to-aspect links. Note that this step can partially overlap with the process shown in FIG. 6, since the method 600 is used to identify the aspects. Thus, the aspects identified in the process of FIG. 6 can be used here.

Scores measuring the similarities of aspects to one another are calculated at step 804. This could include, for example, the processor 120 of the electronic device executing the aspect linkage function 206 to calculate a conditional probability score for any user who mentions both aspects in a pair of aspects. In other embodiments, this could include the processor 120 of the electronic device executing the aspect linkage function 206 to use vector similarities of embeddings to identify related aspects.

Aspects are linked across domains by their scores at step 806. This could include, for example, the processor 120 of the electronic device executing the aspect linkage function 206 to select a specified number of highest-scoring aspect pairs and identifying the aspects in each pair as being related. In other embodiments, this could include the processor 120 of the electronic device executing the aspect linkage function 206 to select a specified number of highest-scoring aspect pairs and identifying the aspects in each pair as being related, where one aspect in each pair resides in a specific domain. For instance, one aspect in each pair may need to reside in the movie or TV show domain, and that aspect can be linked to an aspect in a different domain. In still other embodiments, this could include the processor 120 of the electronic device executing the aspect linkage function 206 to select a specified number of highest-scoring aspect pairs for each pair of domains and identifying the aspects in each pair as being related. This can help to prevent closely-related domains from using all of the top aspect links, thereby allowing other domains to be represented. However the aspect pairs are identified, this information can be used by the graph representation function 208 (such as in step 708) to link the related aspects using edges in the knowledge graph.

Although FIG. 8 illustrates one example of a method 800 for linking aspects of items (possibly across domains), various changes may be made to FIG. 8. For example, while shown as a series of steps, various steps in FIG. 8 could overlap, occur in parallel, occur in a different order, or occur any number of times. Also, FIG. 8 illustrates one example way in which aspects can be linked, and any other suitable technique could also be used here.

Figure 9:
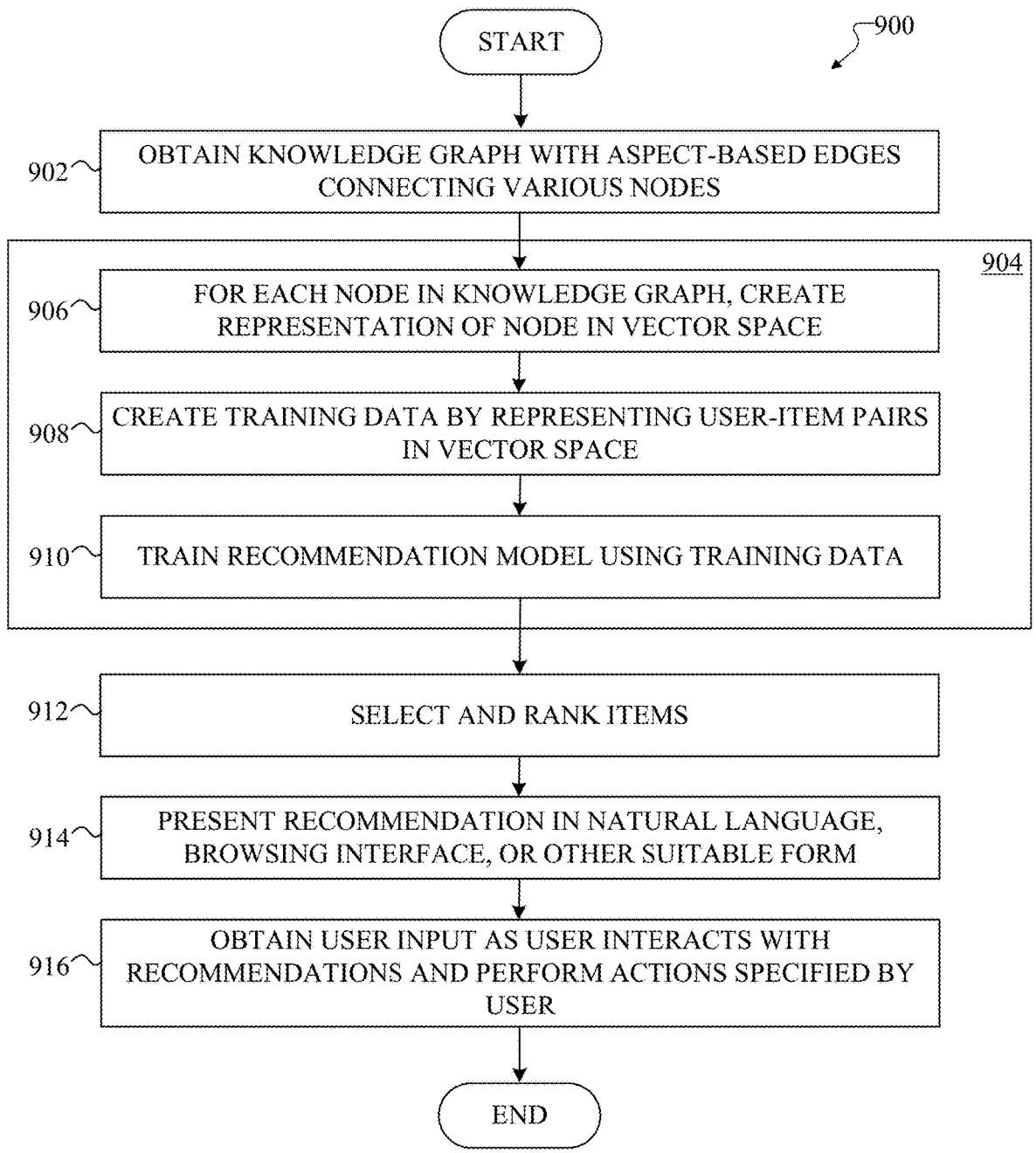
FIG. 9 illustrates an example method for building and using a recommendation engine in accordance with this disclosure.

FIG. 9 illustrates an example method 900 for building and using a recommendation engine in accordance with this disclosure. The method 900 could, for example, be performed as part of step 416 in the method 400 of FIG. 4 and as part of the steps in FIG. 5. For ease of explanation, the method 900 of FIG. 9 may be implemented using an electronic device (such as any of the electronic devices 101, 102, 104 or the server 106) of FIG. 1 to support the use of the recommendation engine 222 and the placement engine 306 in the architectures 200 and 300 shown in FIGS. 2 and 3. However, the method 900 could be implemented using any suitable electronic device(s) in any suitable system.

As shown in FIG. 9, a knowledge graph having aspect-based edges connecting at least some of the nodes in the knowledge graph is obtained at step 902. This could include, for example, the processor 120 of the electronic device executing the shared vector space representation function 210 to obtain the knowledge graph generated earlier by the graph representation function 208. The knowledge graph includes nodes representing users, items, item properties, aspects, and other information, as well as edges connecting the nodes. For nodes representing aspects, the edges can link the nodes representing the aspects to nodes representing items having those aspects, to users having opinions or other relationships to those aspects, and to related aspects.

A recommendation model is trained based on the knowledge graph at step 904. In this example, this includes creating, for each node in the knowledge graph, a representation of the node in vector space. This could include, for example, the processor 120 of the electronic device executing the shared vector space representation function 210 to traverse the knowledge graph and identify the neighboring node(s) for each node in the knowledge graph. This could also include the processor 120 of the electronic device executing the shared vector space representation function 210 to generate representations of the nodes and the edges connecting the nodes in the vector space.

In some embodiments, step 906 can be accomplished as follows. Random walks (paths through the knowledge graph where a nearby node is randomly chosen as a destination) can be generated through the knowledge graph to represent each node's local neighborhood. For instance, a random walk algorithm can be used to generate 500 random walks per node with ten steps per walk. Each walk can be treated as a sentence, and each node visited can be treated as a word. The results of the random walks can be embedded in a vector space using a deep learning algorithm. As a particular example, the Word2Vec models can be used to produce word embeddings in the vector space. In particular embodiments, meaningful sub-graphs can be produced by dividing the knowledge graph, such as by selecting edges of a specific property type or aspect type. For example, a sub-graph in the movie or TV show domain could be constructed by connecting nodes only using edges that represent the producer relationship. This can be repeated to generate sub-graphs for any movie or TV show aspect relationship. Note, however, that in other embodiments no sub-graphs may be created.

Training data is created by representing user-item pairs in the vector space at step 908, and the recommendation model is trained using the training data at step 910. This could include, for example, the processor 120 of the electronic device creating the training data by representing the user-item rating pairs in the vector space. This could also include the processor 120 of the electronic device training the recommendation model using a deep neural network. In some embodiments, for instance, the recommendation model can be trained to predict five-star ratings of items or other rating levels by users (where those items may be used as recommendations for the users). In other embodiments, the recommendation model can be trained to predict whether users would review or not review items (where reviewed items may be used as recommendations for the users). In still other embodiments, the recommendation model can be trained to predict whether ratings of items by users would be above or below three stars or some other rating level (where items above the rating level may be used as recommendations for the users).

After placed into use, items can be selected and ranked at step 912. This could include, for example, the processor 120 of the electronic device executing the recommendation engine 222 and the placement engine 306 to generate a ranked list of recommendations for a particular user. For instance, the suggestion engine 308 could generate an initial list of suggested items and expand the list of suggested items through interactions with the recommendation engine 222. The diversity engine 310 could also interact with the recommendation engine 222 to repeatedly generate a recommendation target, identify a suggested item from the list satisfying the recommendation target, add the identified item to the user's recommendation list (possibly in an order ranked by score), and modify the recommendation target.

The recommended items can be presented to the user in a suitable form at step 914. This could include, for example, the processor 120 of the electronic device executing the placement engine 306 to generate a graphical user interface or natural language text identifying at least one of the recommended items. The graphical user interface or natural language text could provide an explanation for the recommendation, such as by identifying one or more aspects of the recommended item(s) that caused the item(s) to be recommended. User input is obtained as the user interacts with the recommendations and actions are performed as specified by the user at step 916. This could include, for example, the processor 120 of the electronic device detecting that the user is engaging in aspect-based browsing, in which case the processor 120 of the electronic device could (among other things) update the graphical user interface to identify different items associated with aspects that are selected or traversed by the user. Other actions could include purchasing one or more items, viewing content or other items on a user device, or rating the items.

Although FIG. 9 illustrates one example of a method 900 for building and using a recommendation engine, various changes may be made to FIG. 9. For example, while shown as a series of steps, various steps in FIG. 9 could overlap, occur in parallel, occur in a different order, or occur any number of times. Also, FIG. 9 illustrates one example way in which a recommendation engine can be designed and used, and any other suitable technique could also be used here.

Figure 10:
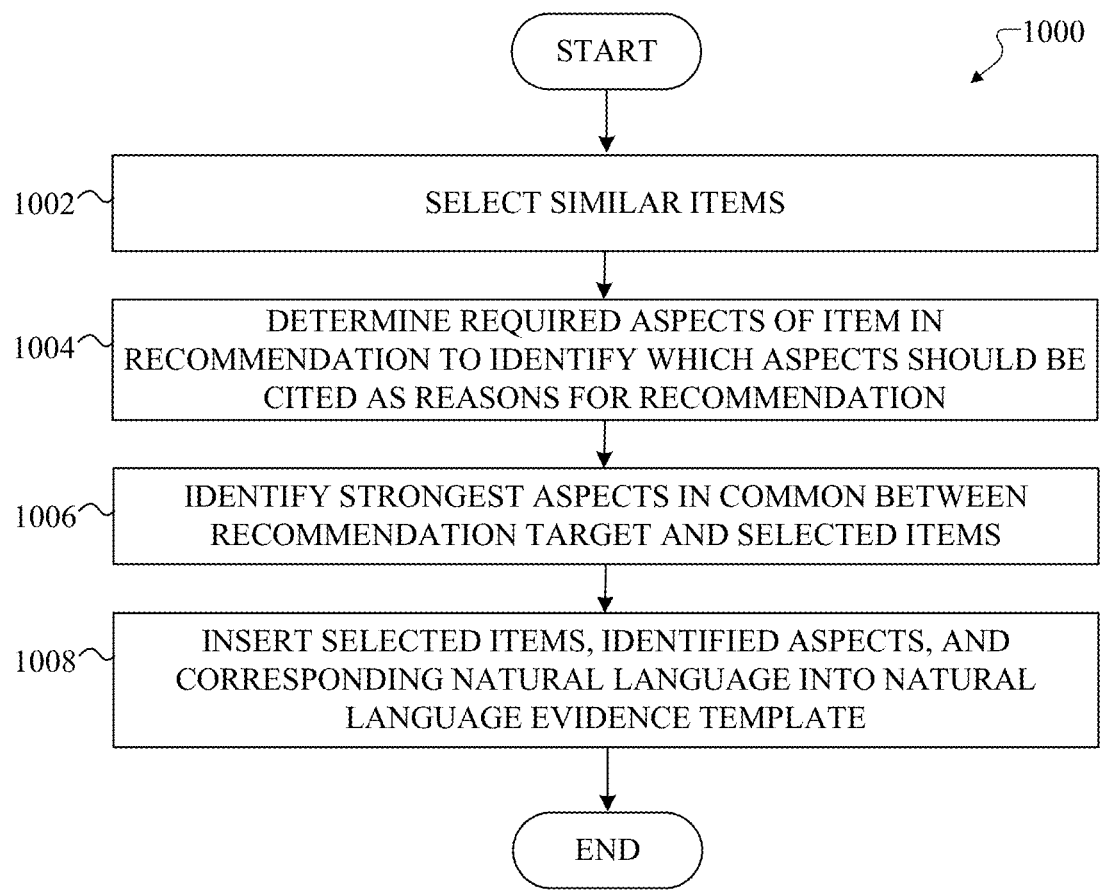
FIG. 10 illustrates an example method for explaining recommendations in a natural language format in accordance with this disclosure.

FIG. 10 illustrates an example method 1000 for explaining recommendations in a natural language format in accordance with this disclosure. The method 1000 could, for example, be performed as part of step 520 in the method 500 of FIG. 5 or as part of the step 914 in FIG. 9. For ease of explanation, the method 1000 of FIG. 10 may be implemented using an electronic device (such as any of the electronic devices 101, 102, 104 or the server 106) of FIG. 1 to support the use of the placement engine 306 in the architecture 300 shown in FIG. 3. However, the method 1000 could be implemented using any suitable electronic device(s) in any suitable system.

As shown in FIG. 10, similar items are selected for the user at step 1002. This could include, for example, the processor 120 of the electronic device selecting items to be recommended to the user (which could be determined as described above). The items can be selected in various ways, such as based on items that the user previously liked, viewed, purchased, or otherwise used, the user's explicit item ratings, or implicit ratings created (such as via data mining). In some embodiments, similarity can be measured based on a cosine distance or as a sum of differences in the vector space defined by the items' embeddings. Note that one item or multiple items could be selected here.

The aspects of the selected item(s) to be included in a recommendation are identified at step 1004. This could include, for example, the processor 120 of the electronic device using the same technique described above to generate a recommendation target. The identified aspects can be cited as reasons why the selected items are being recommended to the user. In context-insensitive embodiments, for example, the recommendation target can be based on the user's vector in the vector space or a combination of aspects that the user likes or otherwise has a positive sentiment about. In context-sensitive embodiments, the recommendation target is based on a currently-highlighted item (such as in a graphical user interface).

The strongest aspect or aspects in common between the recommendation target and one or more selected items are identified at step 1006, and the selected item(s), associated aspect(s), and corresponding natural language are inserted into a natural language evidence template at step 1008. This could include, for example, the processor 120 of the electronic device identifying the aspects with the largest positive weights associated with both the recommendation target and the selected item(s). This can also include the processor 120 of the electronic device treating the portion of the knowledge graph with nodes representing those aspects and items as a sub-graph. The natural language evidence template can use the nodes and the edges connecting the nodes in the sub-graph (along with the sentiment and importance weights/metadata on those edges) to generate a natural language explanation why one or more selected items are being recommended to a user.

Although FIG. 10 illustrates one example of a method 1000 for explaining recommendations in a natural language format, various changes may be made to FIG. 10. For example, while shown as a series of steps, various steps in FIG. 10 could overlap, occur in parallel, occur in a different order, or occur any number of times. Also, FIG. 10 illustrates one example way in which recommendations can be expressed in natural language format, and any other suitable technique could also be used here.

Figure 11:
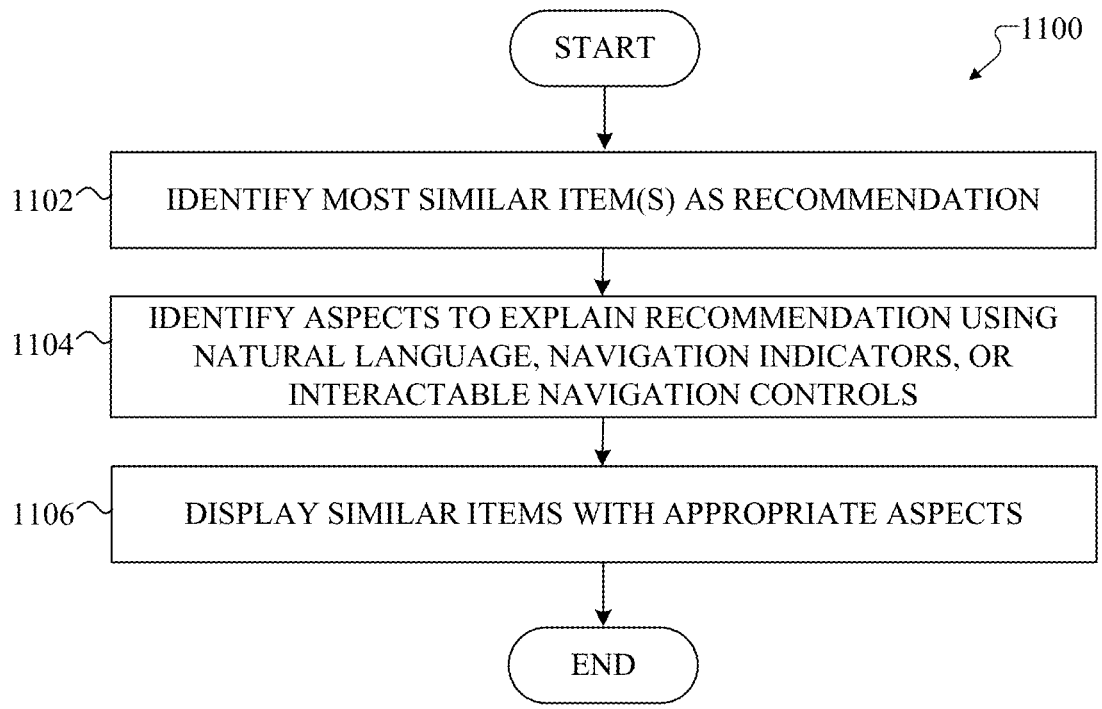
FIG. 11 illustrates an example method for displaying recommendations in a graphical format in accordance with this disclosure.

FIG. 11 illustrates an example method 1100 for displaying recommendations in a graphical format in accordance with this disclosure. The method 1100 could, for example, be performed as part of step 520 in the method 500 of FIG. 5 or as part of the step 914 in FIG. 9. For ease of explanation, the method 1100 of FIG. 11 may be implemented using an electronic device (such as any of the electronic devices 101, 102, 104 or the server 106) of FIG. 1 to support the use of the placement engine 306 in the architecture 300 shown in FIG. 3. However, the method 1100 could be implemented using any suitable electronic device(s) in any suitable system.

As shown in FIG. 11, one or more most similar items are identified at step 1102. This could include, for example, the processor 120 of the electronic device identifying the most similar items in the same manner used in step 1002 described above. Aspects of the similar items to be used to explain recommendations are identified at step 1104. This could include, for example, the processor 120 of the electronic device identifying the related aspects in the same manner used in steps 1004 and 1006 described above.

The similar items are graphically displayed with the appropriate aspects at step 1106. This could include, for example, the processor 120 of the electronic device generating a graphical user interface that identifies a currently-highlighted item and the similar items (although the graphical user interface need not identify a currently-highlighted item). This could also include the processor 120 of the electronic device displaying lines or other graphical features connecting different groups of similar items to a currently-highlighted item or otherwise identifying the similar items. The lines or other graphical features can be labeled, such as by using aspect names. This could further include the processor 120 of the electronic device displaying the aspect names in a form that allows the user to select or deselect the individual aspects. Example non-limiting graphical user interfaces that could be generated here are described below.

Although FIG. 11 illustrates one example of a method 1100 for displaying recommendations in a graphical format, various changes may be made to FIG. 11. For example, while shown as a series of steps, various steps in FIG. 11 could overlap, occur in parallel, occur in a different order, or occur any number of times. Also, FIG. 11 illustrates one example way in which recommendations can be presented in a graphical format, and any other suitable technique could also be used here.

FIGS. 12, 13, 14A, 14B, 15, 16, 17, and 18 illustrate example graphical user interfaces for providing recommendations to users in accordance with this disclosure. For ease of explanation, the graphical user interfaces may be generated using an electronic device (such as any of the electronic devices 101, 102, 104 or the server 106) of FIG. 1. However, the graphical user interfaces could be generated using any suitable electronic device(s) in any suitable system.

Figure 12:
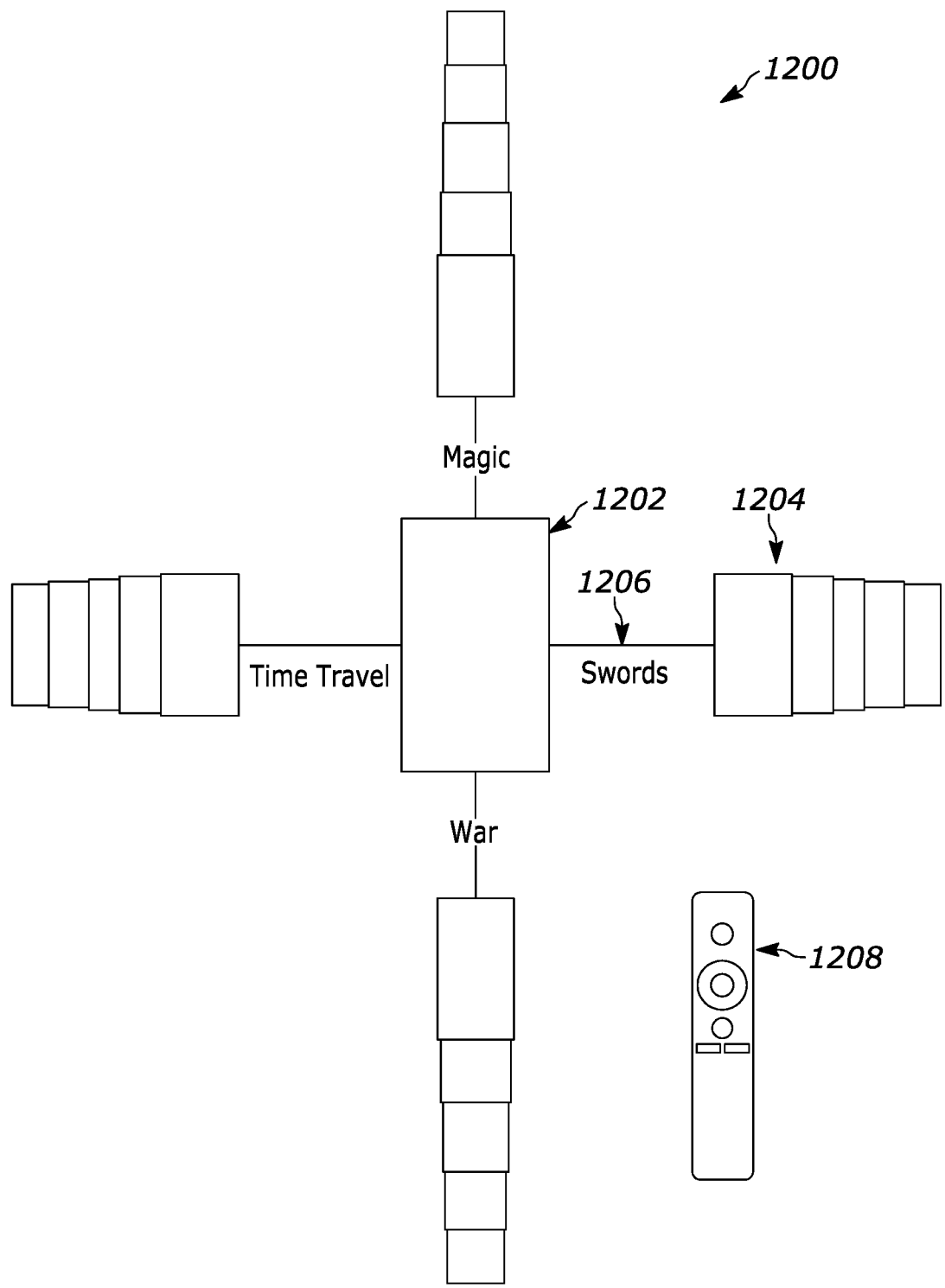

As shown in FIG. 12, a graphical user interface 1200 includes a primary graphical representation of an item 1202 (in this example, a particular movie). The graphical user interface 1200 also includes graphical representations of one or more groups of recommended items 1204 that are associated with the item 1202. Here, multiple groups of recommended items 1204 are positioned generally evenly around the item 1202, although other arrangements could be used. Each group of recommended items 1204 is associated with the item 1202 via a link 1206, which includes a label identifying one aspect associated with the item 1202. Each group of recommended items 1204 is associated with the item 1202 through a different aspect of the item 1202. Effectively, the graphical user interface 1200 identifies both (i) different aspects of the item 1202 and (ii) different recommended items 1204 based on those different aspects.

When the graphical user interface 1200 is first presented to a user, the item 1202 could be highlighted, such as by using a blue box around the item 1202 or other indicator. A user could use a remote control 1208, voice commands, or other input mechanism to move the indicator within the graphical user interface 1200, such as to move the indicator to one of the groups of recommended items 1204. Each group of recommended items 1204 can be scrollable, meaning the user could select each item 1204 in a group in sequence to view (and possibly select) that item 1204. The items 1204 in each group can be ordered, such as based on the significance of the associated aspect to those items 1204 and the user's sentiment towards those aspects. Thus, for example, the item 1204 presented first in each group can have the strongest association with the aspect linking that group of items 1204 to the item 1202.

If a user selects a particular item 1204 in one of the groups, different actions could occur depending on the implementation. In some embodiments, for example, the user could be presented with a graphical user interface that allows the user to purchase, preview, rent, view, or otherwise use the selected item 1204. In other embodiments, the graphical user interface 1200 could be updated so that the selected item 1204 is now shown as the item 1202, and the groups of recommended items 1204 and the links 1206 can be updated for the new item 1202. In these embodiments, the user could select the item 1202 in order to purchase, preview, rent, view, or otherwise use the item 1202.

The remote control 1208 here could include various features that allow a user to navigate within the graphical user interface 1200 and select items. For example, in some embodiments, the remote control 1208 includes a wheel that allows the user to depress the wheel in certain directions or in any direction around the wheel, and the pressing direction of the wheel is translated into a selection of one of the links 1206, movement within one of the groups of recommended items 1204, or movement between different groups of recommended items 1204. A button within the wheel or outside the wheel can be used to select a particular highlighted item in the graphical user interface 1200. Other remote controls 1208 could include touchscreens or trackpads. Here, the direction of user swipes can be translated into a selection of one of the links 1206 or movement within one of the groups of recommended items 1204 or between different groups of recommended items 1204, and a tap or press can be used to select a particular highlighted item. Still other remote controls 1208 can support voice interactions, and navigation moves within the graphical user interface 1200 can be based on received verbal commands.

Figure 13:
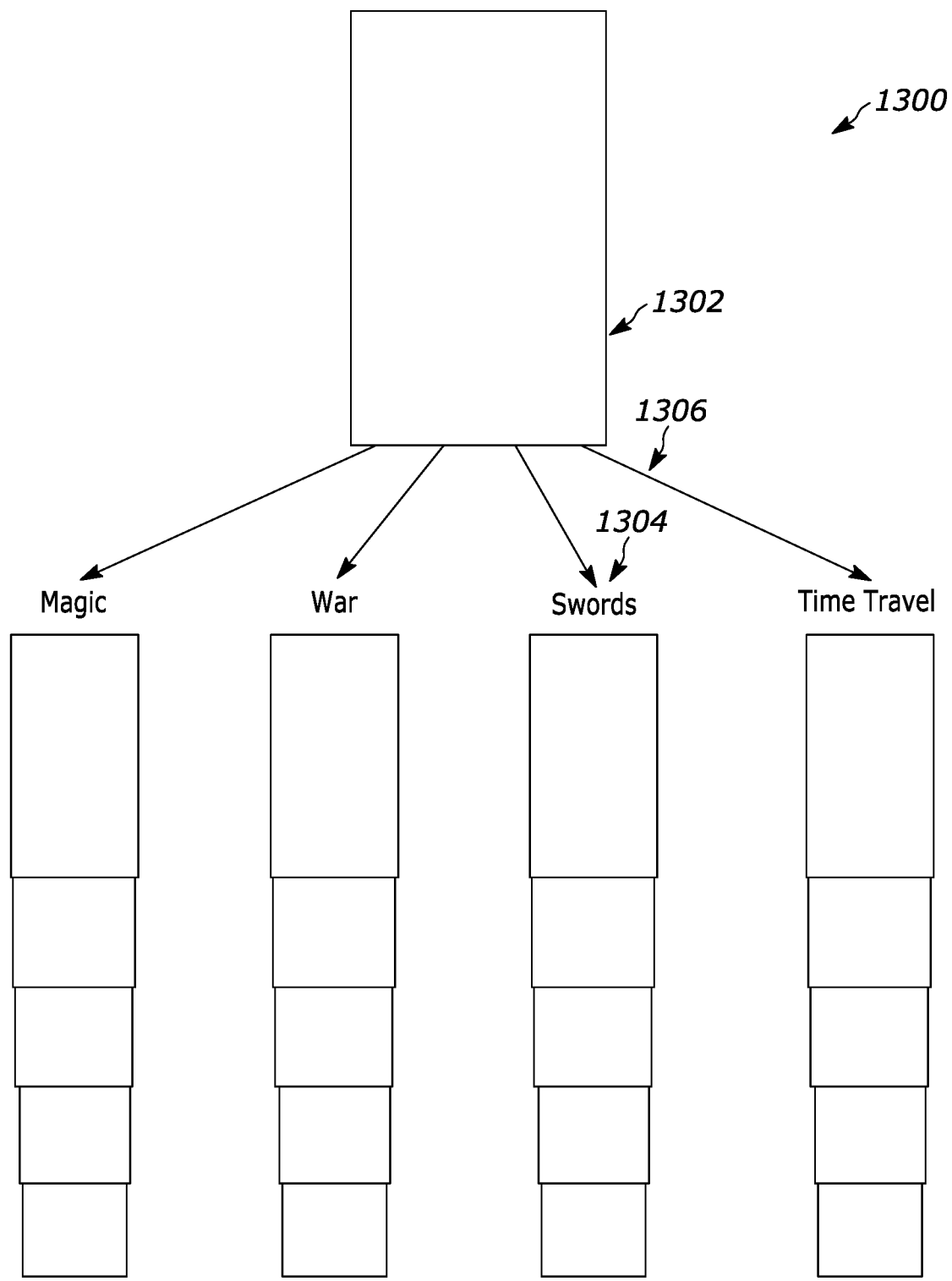

As shown in FIG. 13, a graphical user interface 1300 includes a primary graphical representation of an item 1302 (in this example, a particular movie) and multiple groups of recommended items 1304 that are associated with the item 1302. Each group of recommended items 1304 is associated with the item 1302 via a link 1306, each of which includes a label identifying one aspect associated with the item 1302 and with that group of recommended items 1304. Again, the graphical user interface 1300 identifies both (i) different aspects of the item 1302 and (ii) different recommended items 1304 based on those different aspects. The groups of recommended items 1304 in this example are displayed as vertical groups positioned next to each other. Depending on the implementation, the aspects could be organized from left-to-right or right-to-left in order of importance, or other organizations (or random ordering) can be used. Alternatively, the groups of recommended items 1304 can be displayed as horizontal groups positioned next to each other. Depending on the implementation, the aspects could be organized from top-to-bottom or bottom-to-top in order of importance, or other organizations (or random ordering) can be used.

When the graphical user interface 1300 is first presented to a user, the item 1302 could be highlighted, such as by using a blue box around the item 1302 or other indicator. A user could use a remote control or other input mechanism to move the indicator within the graphical user interface 1300, such as to move the indicator to one of the groups of recommended items 1304. Each group of recommended items 1304 can be scrollable, meaning the user could select each item 1304 in a group in sequence to view (and possibly select) that item 1304. If a user selects a particular item 1304 in one of the groups, the user could be presented with a graphical user interface that allows the user to purchase, preview, rent, view, or otherwise use the selected item 1304, or the graphical user interface 1300 could be updated so that the selected item 1304 is now shown as the item 1302 with updated groups of recommended items 1304 and links 1306 for the new item 1302.

Figure 14A:
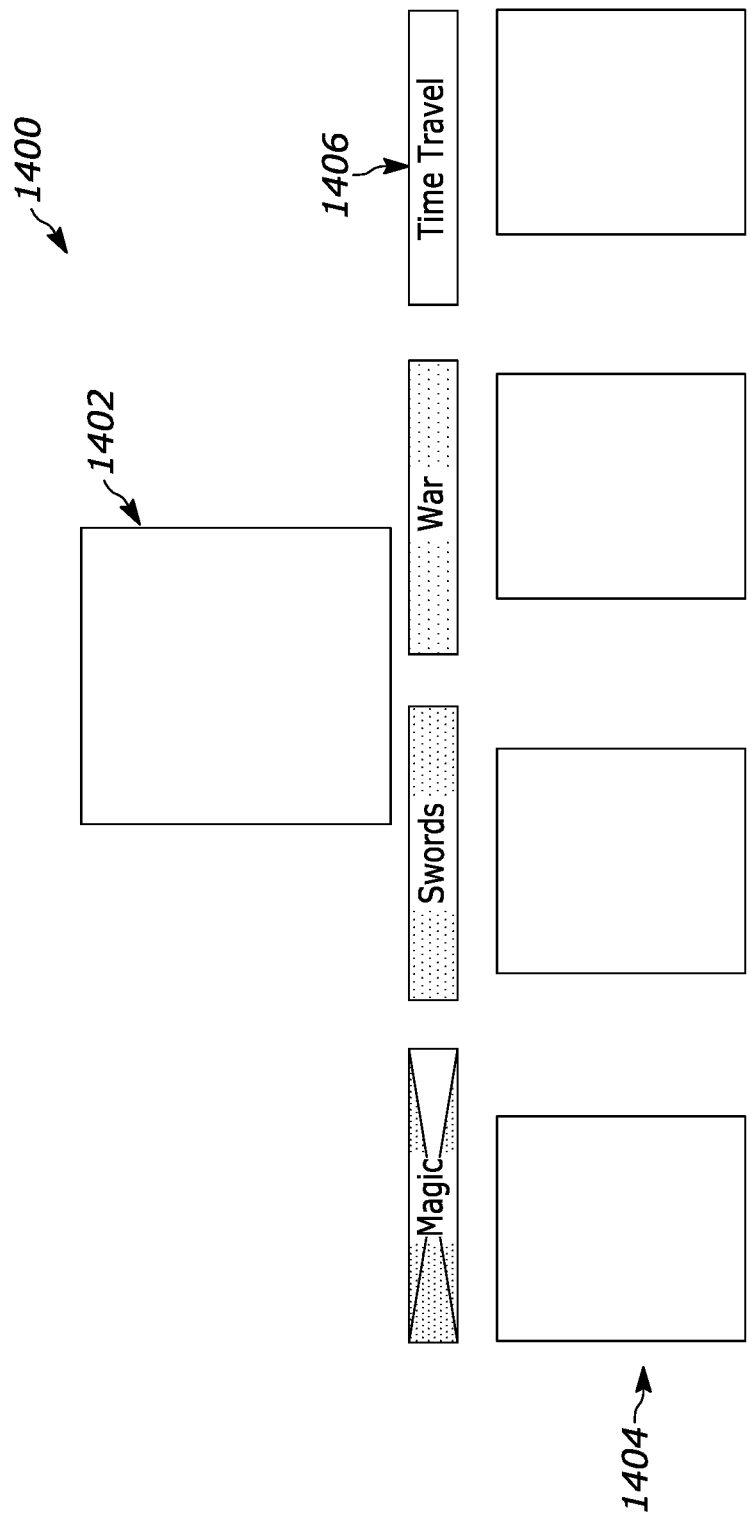
Figure 14B:
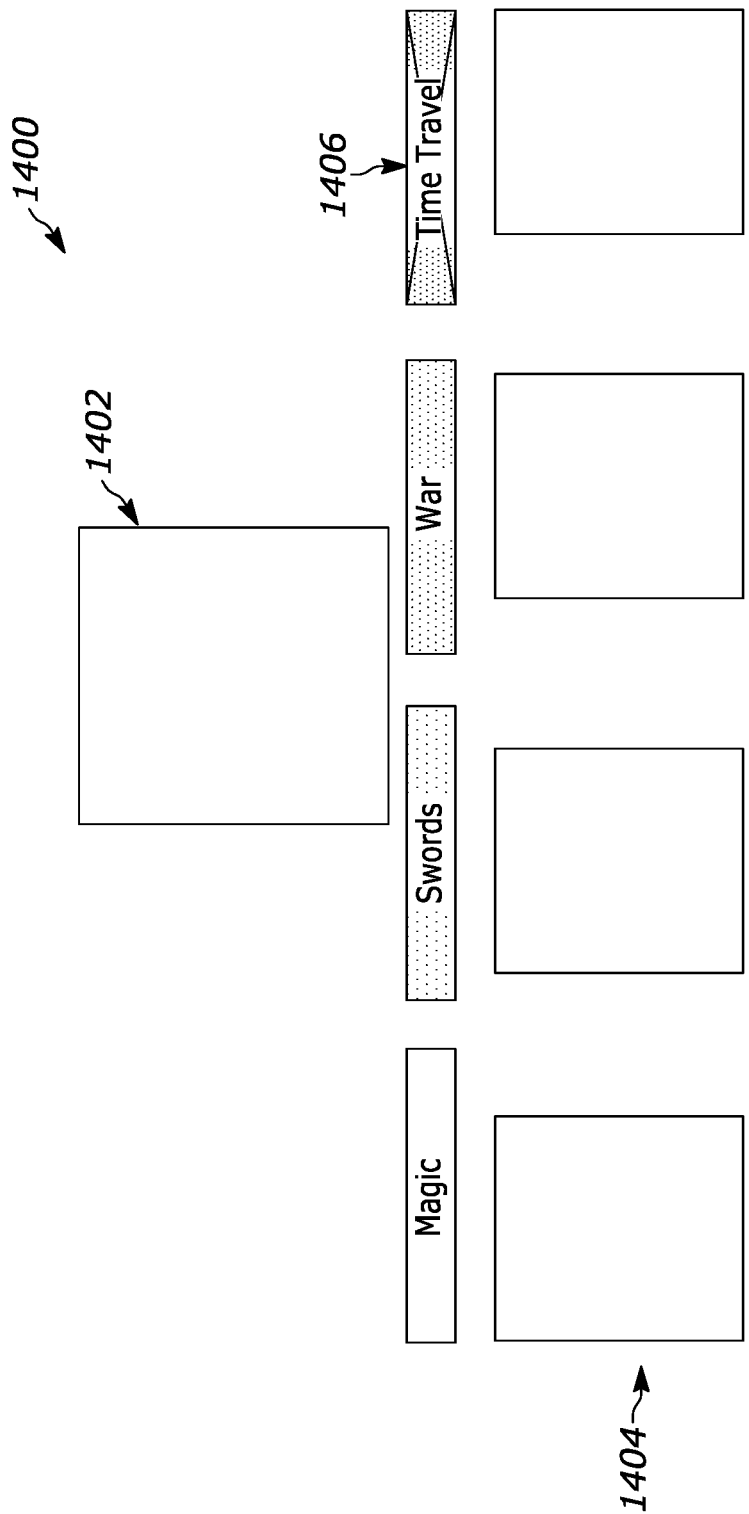

As shown in FIG. 14A, a graphical user interface 1400 includes a primary graphical representation of an item 1402 (in this example, a particular movie) and a group of recommended items 1404. The graphical user interface 1400 also includes multiple selectable buttons 1406 associated with different aspects of the item 1402. Each selectable button 1406 can be operated by a user to provide an indication of the user's preference towards the associated aspect. Different indicators (such as different colors or patterns) could be used to identify the different user preferences towards the aspects. In FIG. 14A, the user has indicated that the user has a positive preference for the "swords" and "war" aspects, a neutral preference for the "time travel" aspect, and a negative preference for the "magic" aspect. The buttons 1406 here therefore represent three-state buttons, although the buttons 1406 could support any number of states. The recommended items 1404 in the group can be selected in accordance with these preferences. In FIG. 14B, the user has changed the states of several buttons 1406 to indicate that the user has a positive preference for the "swords" and "war" aspects, a neutral preference for the "magic" aspect, and a negative preference for the "time travel" aspect. This leads to the generation of a new group of items 1404' based on the revised user preferences.

When the graphical user interface 1400 is first presented to a user, the item 1402 could be highlighted, such as by using a blue box around the item 1402 or other indicator. A user could use a remote control or other input mechanism to move the indicator within the graphical user interface 1400, such as to move the indicator to one of the items 1404 or 1404' in the group or to one of the buttons 1406. The group of items 1404 or 1404' can be scrollable, meaning the user could select each item 1404 or 1404' in the group in sequence to view (and possibly select) that item. If a user selects a particular item 1404 or 1404' in the group, the user could be presented with a graphical user interface that allows the user to purchase, preview, rent, view, or otherwise use the selected item 1404 or 1404', or the graphical user interface 1400 could be updated so that the selected item 1404 or 1404' is now shown as the item 1402 with an updated group of items and updated buttons for the new item 1402.

Figure 15:

As shown in FIG. 15, a graphical user interface 1500 provides a recommendation to a user in a natural language format. In particular, the natural language recommendation identifies a particular item being recommended and an explanation for the recommendation. The explanation here takes the form of at least some of the aspects justifying the recommendation. As noted above, a natural language evidence template can be used to generate the natural language recommendation. In addition, hyperlinks or other navigation aids can be provided for items and aspects, which could be selected by a user to view information related to the selected item or aspect. It should be noted that the natural language recommendation can also be spoken by an electronic device, such as when the natural language recommendation is spoken to a user as a response in an interactive dialogue.

Figure 16:
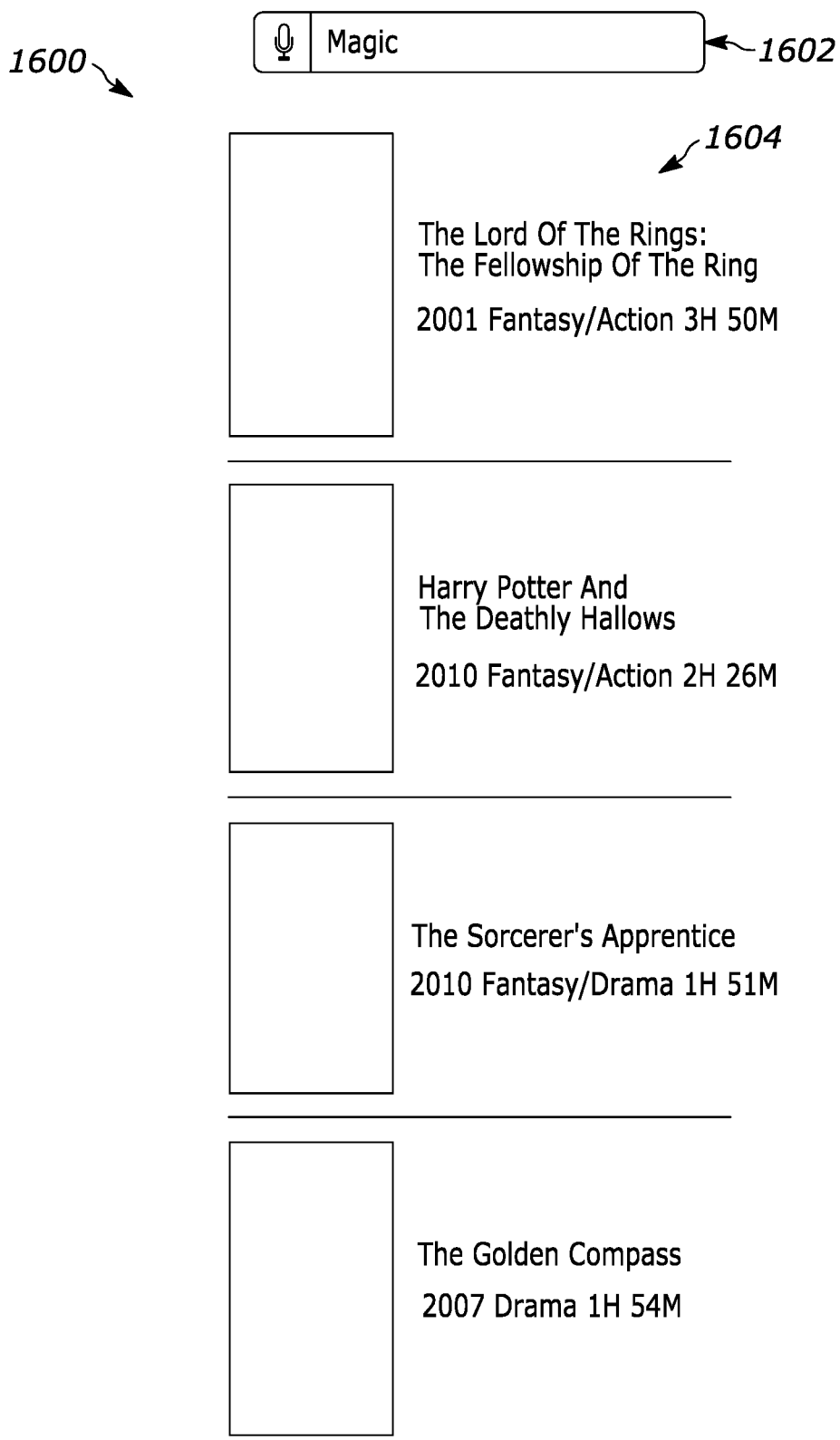

As shown in FIG. 16, a graphical user interface 1600 allows a user to type or vocally provide one or more aspects in a text box 1602, or the user could select one or more aspects from a cloud or list of aspects. A list 1604 of items having the one or more aspects could then be provided to the user. The user could navigate through the list 1604 to select one of the items, which could allow the user to purchase, preview, rent, view, or otherwise use the selected item or view information about the selected item. The items in the list 1604 could be ranked, such as by significance of the searched aspect(s) to those items in the list 1604 and the user's sentiment towards the searched aspects(s).

As shown in FIG. 17, a graphical user interface 1700 provides cross-domain item recommendations to a user. In particular, the graphical user interface 1700 provides, for a specific item (namely a particular movie), recommendations for other movies as well as recommendations for products like music, books, cell phone accessories, and home/kitchen accessories. Of course, any other suitable same-domain and cross-domain recommendations can be made.

In FIG. 17, the graphical user interface 1700 includes a section 1702 identifying a specific item. In this example, the section 1702 identifies a movie, information about the movie, and options for playing the movie and seeing where the movie is available. The specific item here could represent a currently-highlighted item identified by a user via a different graphical user interface. The graphical user interface 1700 also includes a list 1704 of same-domain recommended items, meaning the items in the list 1704 are in the same domain as the item identified in the section 1702 of the graphical user interface 1700. In addition, the graphical user interface 1700 includes a list 1706 of cross-domain recommended items, meaning the items in the list 1706 are in one or more different domains than the item identified in the section 1702 of the graphical user interface 1700. Both lists 1704 and 1706 could be navigable by the user, allowing the user to view more information about or purchase the items in both lists 1704 and 1706.

Figure 18:
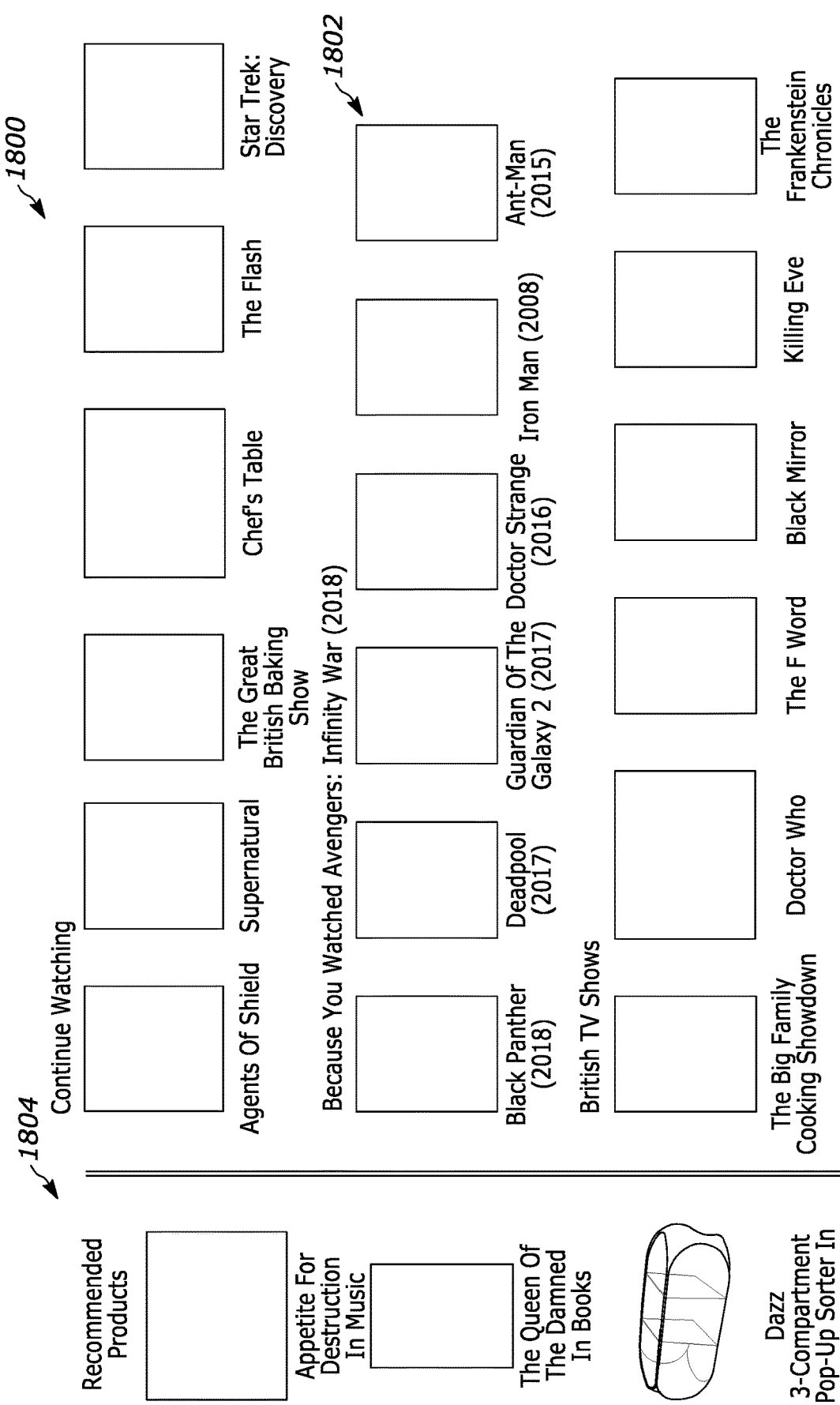

As shown in FIG. 18, a graphical user interface 1800 includes one or more lists 1802 of items associated with a user. In this example, the lists 1802 include items that the user previously watched or started watching, same-domain items recommended to the user, and other items the user might find interesting. The graphical user interface 1800 also includes a list 1804 of cross-domain recommended items. Again, the user could navigate and select items in any of the lists 1802 and 1804, allowing the user to view more information about or purchase the items in the lists 1802 and 1804. One difference between the lists 1706 and 1804 in the graphical user interfaces 1700 and 1800 is that the list 1706 is presented in response to the user's selection of a particular item, while the list 1804 can be presented to the user in general without requiring selection of a particular item.

Although FIGS. 12, 13, 14A, 14B, 15, 16, 17, and 18 illustrate examples of graphical user interfaces for providing recommendations to users, various changes may be made to FIGS. 12, 13, 14A, 14B, 15, 16, 17, and 18. For example, the content and arrangement of each graphical user interface are for illustration only. Recommendations can be provided to users in any other suitable manner without departing from the scope of this disclosure.

FIGS. 19A, 19B, 19C, 19D, and 19E illustrate an example knowledge graph 1900 and example updates to the knowledge graph 1900 in accordance with this disclosure. For ease of explanation, the knowledge graph 1900 may be used by an electronic device (such as any of the electronic devices 101, 102, 104 or the server 106) of FIG. 1. However, the knowledge graph 1900 could be used by any suitable electronic device(s) in any suitable system.

Figure 19A:
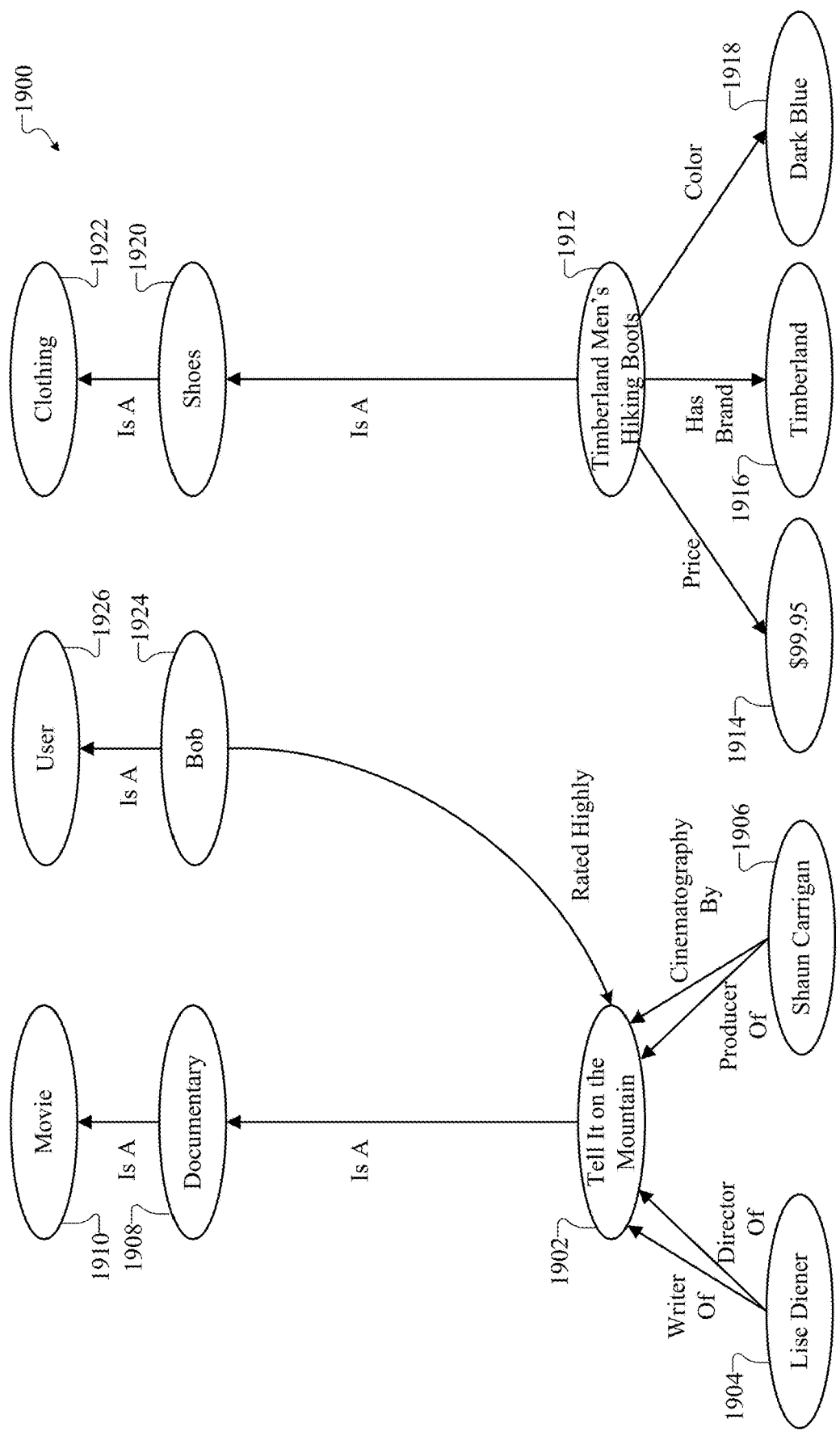
FIGS. 19A, 19B, 19C, 19D, and 19E illustrate an example knowledge graph and example updates to the knowledge graph in accordance with this disclosure.

As shown in FIG. 19A, the knowledge graph 1900 includes a node 1902 representing a first item, namely a movie titled "Tell It on the Mountain" in this example. Nodes 1904 and 1906 connected to the node 1902 identify properties of the first item, such as the writer/director and the producer/cinematographer of the movie. A node 1908 connected to the node 1902 identifies a type of the first item, namely a "documentary" in this example. A node 1910 connected to the node 1908 identifies a domain of the first item, namely a "movie" in this example. The knowledge graph 1900 also includes a node 1912 representing a second item, namely a specific product (hiking boots) in this example. Nodes 1914, 1916, and 1918 connected to the node 1912 identify properties of the second item, namely a price, a brand, and a color in this example. A node 1920 connected to the node 1912 identifies a type of the second item, namely "shoes" in this example. A node 1922 connected to the node 1920 identifies a domain of the second item, namely "clothing" in this example. In addition, a node 1924 represents a particular user, and a node 1926 represents a domain of the node 1924. An edge connects the nodes 1902 and 1924 and indicates that the user at some point highly rated the first item represented by the node 1902.

Figure 19B:
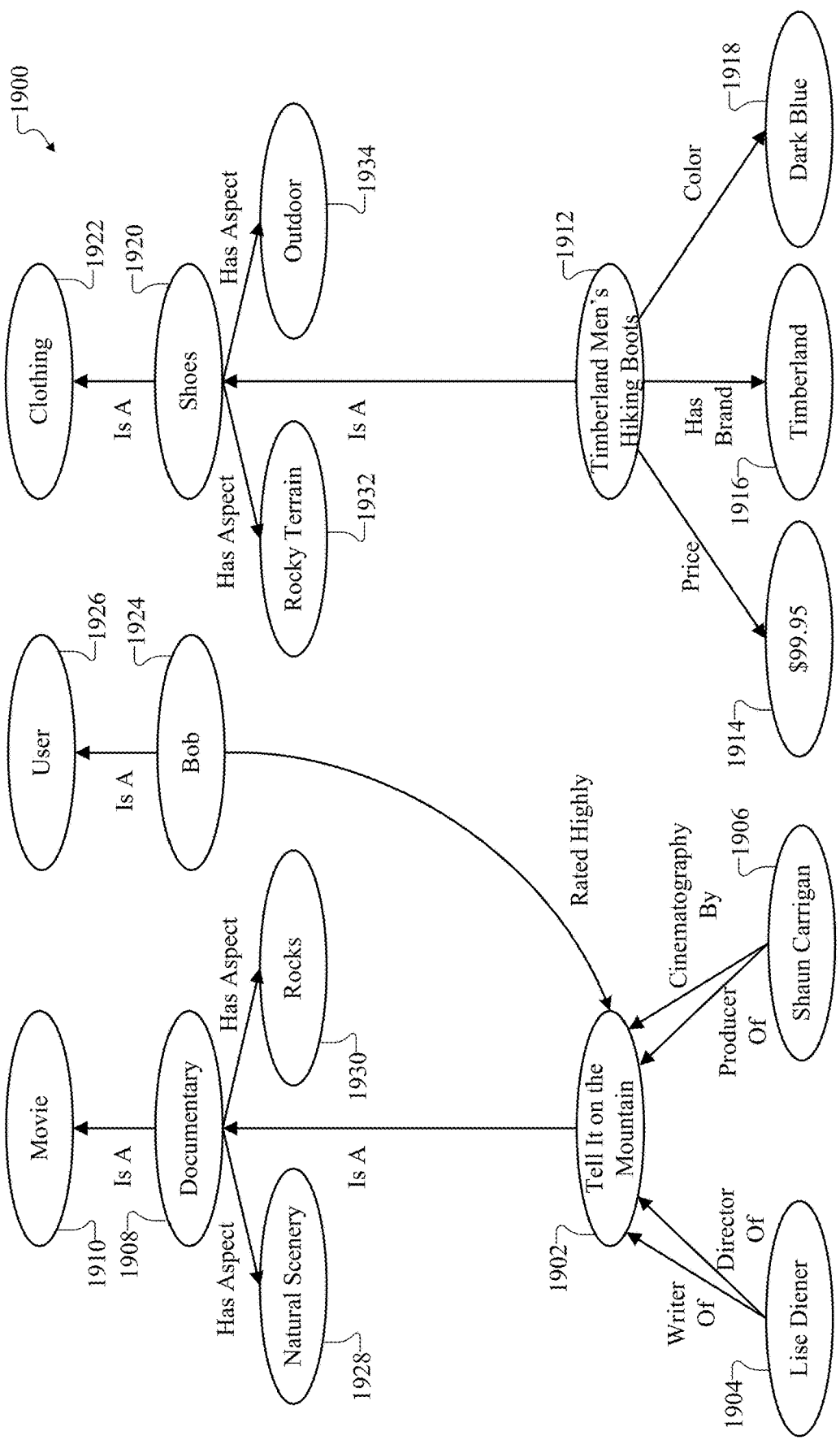

As shown in FIG. 19B, two aspects have been identified for the type of the first item and added as nodes 1928 and 1930 connected to the node 1908. In this example, the two aspects are "natural scenery" and "rocks," which may be commonly-mentioned aspects of documentaries mentioned in user reviews or other input data 202. Similarly, two aspects have been identified for the type of the second item and added as nodes 1932 and 1934 connected to the node 1920. In this example, the two aspects are "rocky terrain" and "outdoor," which again may be commonly-mentioned aspects of shoes mentioned in user reviews or other input data 202.

Figure 19C:
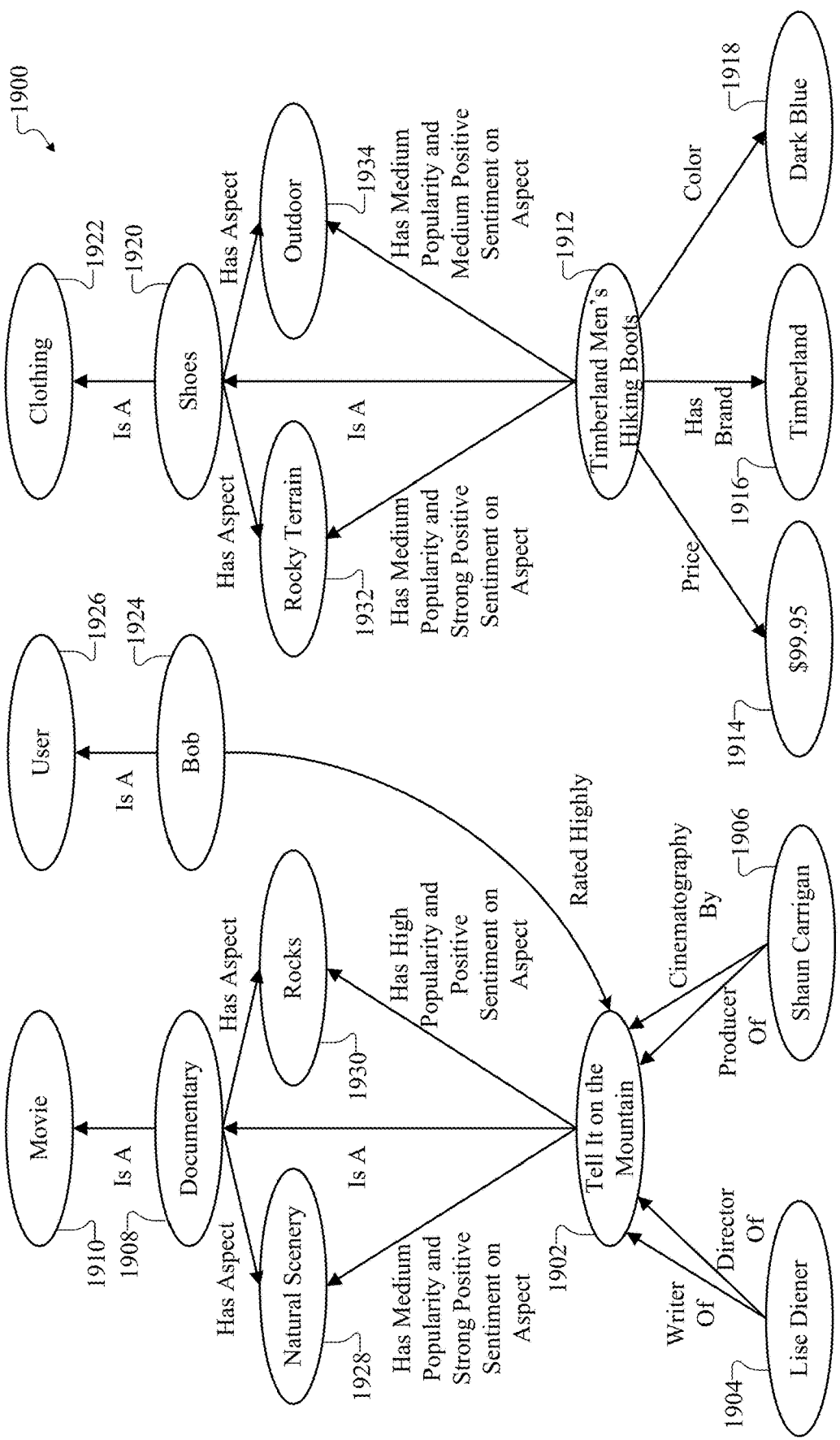

As shown in FIG. 19C, the node 1902 representing the first item has been connected by additional edges to the nodes 1928 and 1930 representing the aspects of the first item type. Similarly, the node 1912 representing the second item is connected by additional edges to the nodes 1932 and 1934 representing the aspects of the second item type. Each of these additional edges is associated with two weights, which in this example identify a popularity (importance) of the aspect associated with the additional edge and the user sentiment of the aspect associated with the additional edge.

Figure 19D:
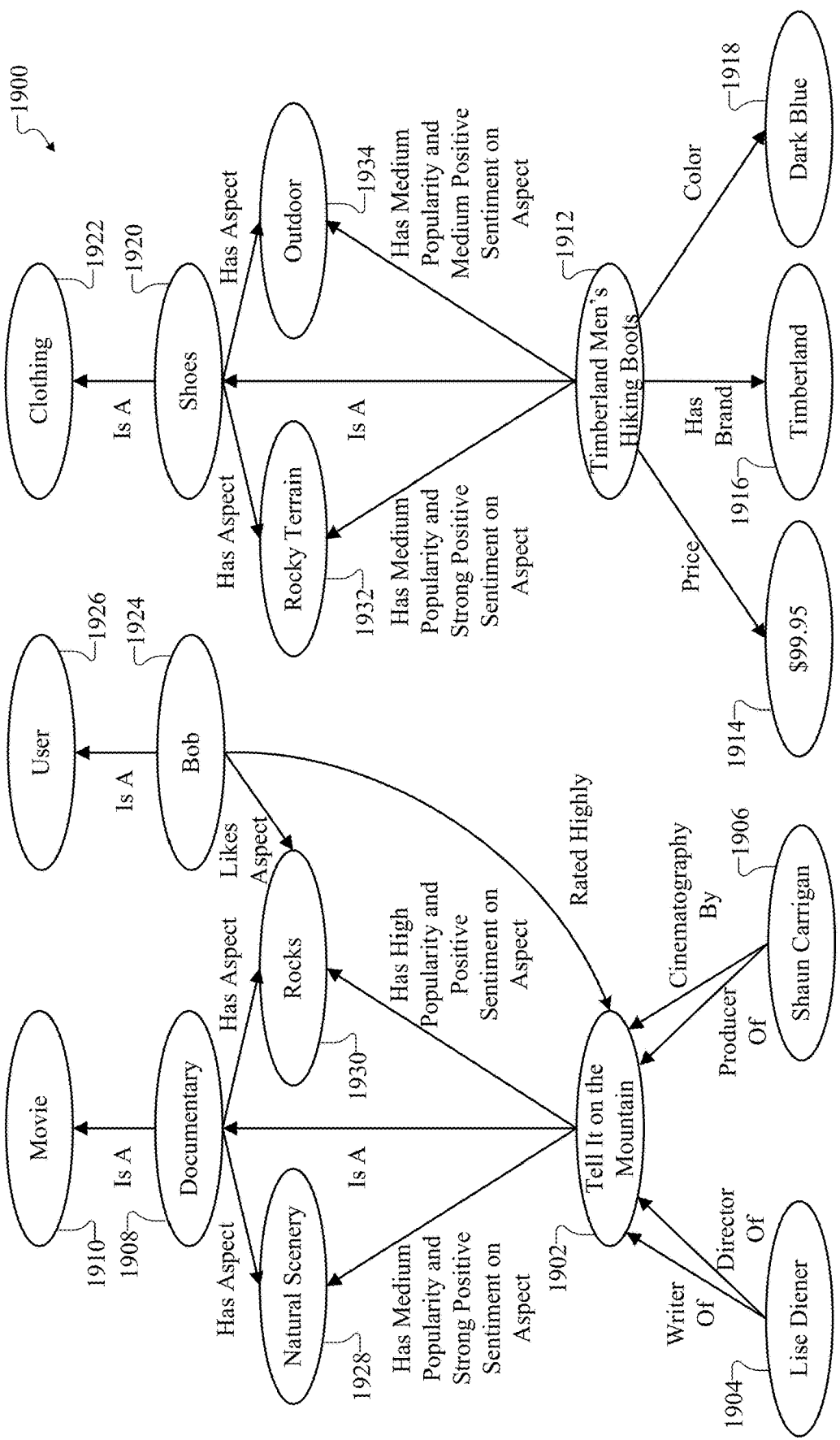

As shown in FIG. 19D, the node 1924 representing the user has been linked by an additional edge to the node 1930 representing one of the aspects of the first item type. This additional edge indicates that the user represented by the node 1924 likes the particular aspect represented by the node 1930.

Figure 19E:
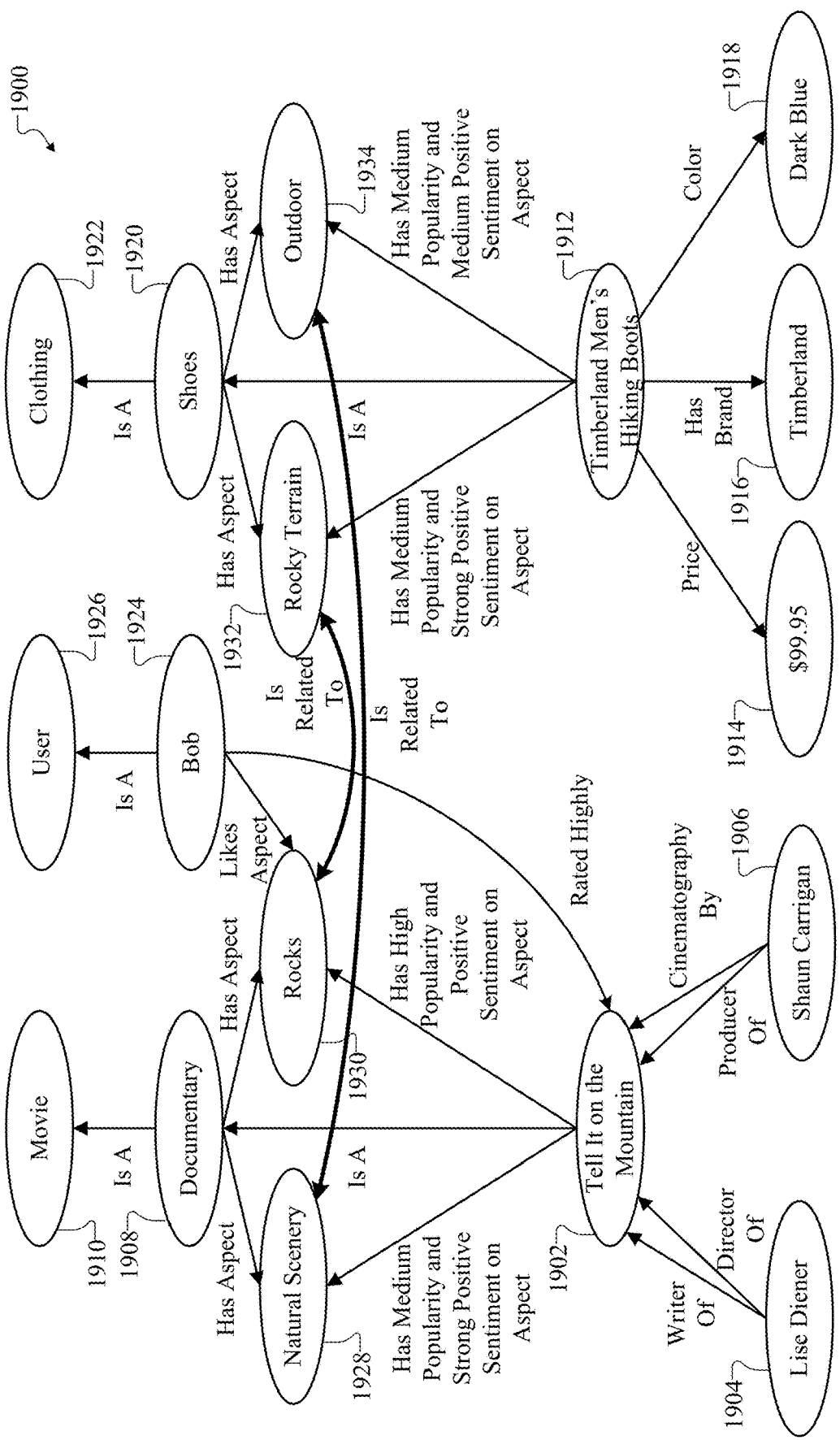

As shown in FIG. 19E, the nodes 1928 and 1934 have been connected by an additional edge, and the nodes 1930 and 1932 have been connected by an additional edge. These additional edges indicate that the aspects represented by the nodes 1928 and 1934 are related and that the aspects represented by the nodes 1930 and 1932 are related. As noted above, these relationships can be determined based on multiple users' interests in the aspects across domains. These relationships enable a recommendation system to recommend an item in a second domain based on a user's preferences and sentiments related to a first domain. In this example, the user represented by the node 1924 has shown a preference to the aspect represented by the node 1930, which may allow the recommendation system to recommend the item represented by the node 1912 (via the relationship between the aspects represented by the nodes 1930 and 1932).

Although FIGS. 19A, 19B, 19C, 19D, and 19E illustrate one example of a knowledge graph 1900 and examples of updates to the knowledge graph 1900, various changes may be made to FIGS. 19A, 19B, 19C, 19D, and 19E. For example, the nodes and edges shown in the knowledge graph 1900 are examples only, and any other suitable nodes and edges can be used in a knowledge graph.

The following represents details of a specific example implementation of a recommendation system that is designed in accordance with this disclosure. In general, in the context of movies, one or more textual aspect discovery algorithms can be used to discover core plot elements of movies, and the core plot elements (aspects) can be linked with the movies in a knowledge graph. To account for less reliable (but high density) automatically-discovered edges, the Entity2Rec algorithm or other recommendation generator can be extended by replacing its traditional ranker with a deep neural network designed to properly balance knowledge encoded in each type of edge. Aspects extracted from user reviews of movies can improve overall recall by linking otherwise disconnected movies through their aspects. A deep learning-based recommendation system can therefore use embeddings learned from the Entity2Rec knowledge graph (or other knowledge graph) to make recommendations to users. Additional content-based information, such as aspects extracted from a large corpus of movie-related data, can be used to increase the recommendation system's performance.

Now in greater detail, since aspects capture comparable and semantically-coherent attributes of items, aspects (as applied to movies) can highlight themes that occur in movie plots. These aspects can represent a source of information for linking movies that are potentially interesting to users. Aspects can therefore be extracted from plot summaries, plot synopses, user reviews, or other textual data, and a deep learning network can treat each movie property (such as subject, director, actors, actresses, aspects, etc.) individually with its own network architecture before fine-tuning concatenated outputs through a bottlenecked deep learning network. In some embodiments, scaling up (instead of scaling down) the layer size directly after the concatenation of individual inputs leads to much better recommendation performance.

With their ability to learn meaningful models from high-dimensional and diverse input data, deep neural networks allow for the creation of high performing hybrid models that represent both collaborative user feedback and content-based features of content recommendations. As a result, user and movie information can be modeled through individual networks before combining the information through a separate interaction network. Embeddings can be extracted from a knowledge graph as inputs to a very deep (such as a 52-layer) bottleneck architecture deep learning model in order to generate highly-precise content recommendations.

Thus, a recommendation system can be implemented as follows. Various data is received and processed to identify aspects of movies. For example, the MovieLens1M dataset collected by MOVIELENS.ORG can be used. MOVIELENS.ORG allows users to rate movies and provides personalized movie recommendations to the users based on their ratings. The MovieLens1M dataset is actually a smaller subset of a larger dataset that provides millions of user ratings. The smaller dataset provides a large amount of data in terms of total ratings and ratings per user and per movie, and there is a great deal of diversity in terms of movies and users. The smaller dataset is adequate for use with advanced techniques such as deep machine learning and can be used to generalize results obtained using the dataset to other user populations. Also, content-related data from the DBPEDIA knowledge base can be used. This knowledge base provides detailed information about movies, where the detailed information ranges from high-level knowledge (such as directors, actors, actresses, and music composers) to more fine-grained categorizations of individual movies. In addition, plot summaries and plot synopses from IMDB.COM can be used.

This information is processed to identify (among other things) various aspects of the movies, and at least one knowledge graph that includes the identified aspects is generated. In some embodiments, diverse user interests are modeled in the knowledge graph using embeddings for movies, users, movie property types, and relationship types. Those embeddings serve as inputs to a deep neural network that models the complex dynamics between the embeddings and each user's likelihood to find movies relevant to each user. Deep neural networks enjoy a lot of popularity for their ability to learn meaningful connections between high-dimensional input data and output labels over large amounts of labeled or unlabeled data. In some embodiments, a fully-connected deep neural network can be used here, which refers to a network that can learn a weighted function between its inputs and outputs. However, other types of neural networks could also be used here.

In some embodiments, a deep learning network can be used as follows. The Entity2Rec algorithm (or other recommendation generator) takes as input a knowledge graph in the form of edge lists, which encode combined collaborative and content information determined earlier. In order to create a property-specific embedding (such as embeddings for user-specific and movie-specific information like a director of a movie or a user's rating for a movie), the knowledge graph is split into independent property graphs. For each property graph, the Node2Vec algorithm (or other algorithm) can be used to create a k-length property embedding. Node2Vec performs a series of random walks from each node in a property sub-graph and treats the resulting walks as sentence inputs to the Word2Vec algorithm. Through this process, embeddings are created for each node in each property sub-graph. Node2Vec uses several parameters to control the resulting embeddings, such as the length l of the walk from each node, the number n of walks per node, the size d of the embedding, the likelihood P of returning to a previously-visited node, and the likelihood Q of moving further away from the starting node. In some instances, the following parameter values can be used:

$$l=10, n=500, d=500, P=1, Q=4 \qquad (2)$$

The embeddings extracted in this manner or any other suitable manner are used as inputs to a deep learning model. One specific example network architecture could model each property input independently through a deep neural network. This may allow the network to learn a more fine-grained weighting of each input and thus improve the overall recommendation result. Another specific example network architecture could concatenate all property inputs into one larger input that is fed into a deep neural network. However designed, the deep neural network can be set up as a regression that models a user's rating on a particular item. For each user-item pair, there could be various inputs, such as user embedding, item embedding, subject embedding, writer embedding, starring embedding, producer embedding, narrator embedding, music composer embedding, editing embedding, director embedding, cinematography embedding, and based-on embedding.

Figure 20A:
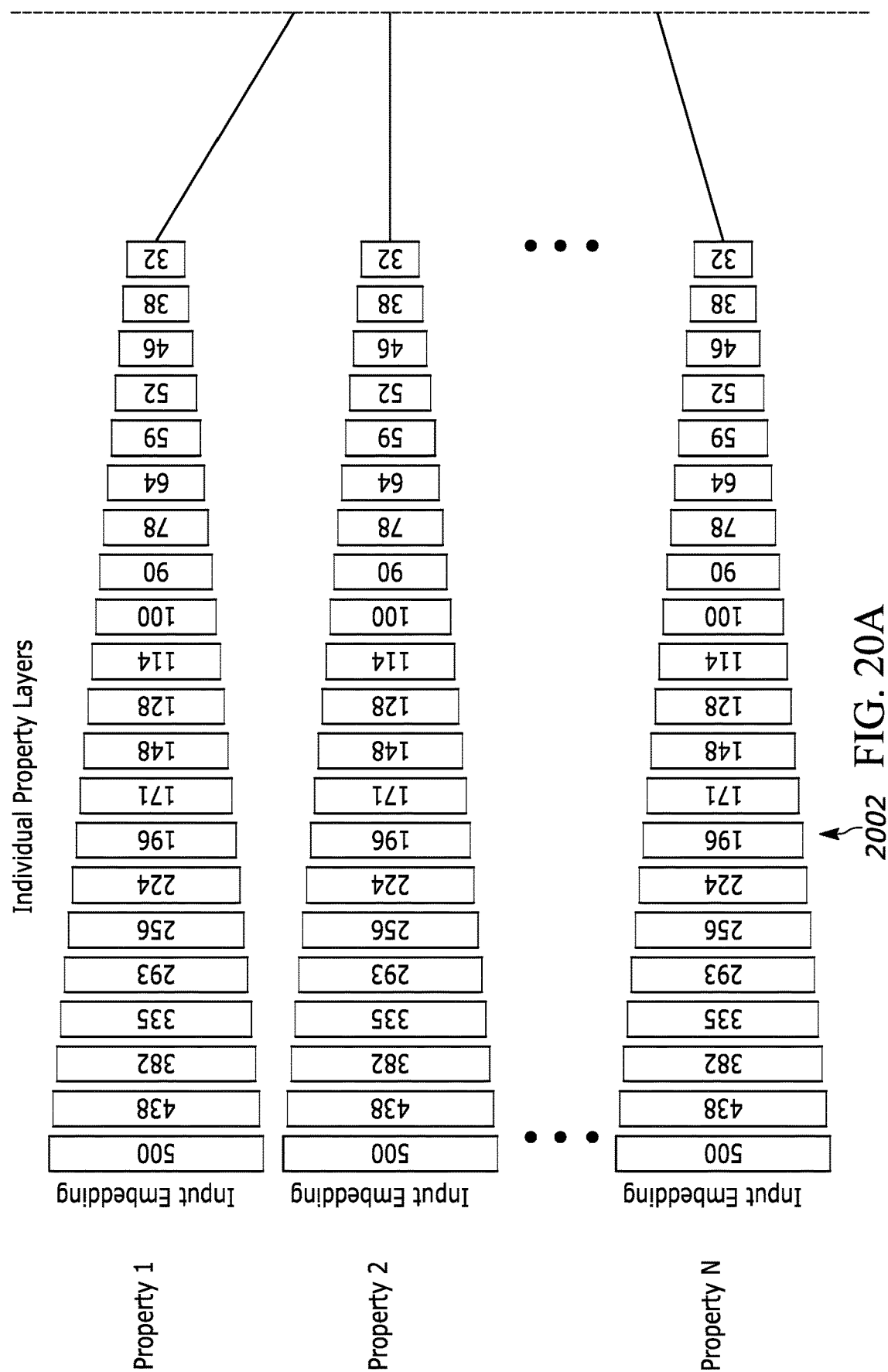
FIG. 20 illustrates a specific example of an architecture for processing data and making recommendations in accordance with this disclosure.
Figure 20B:
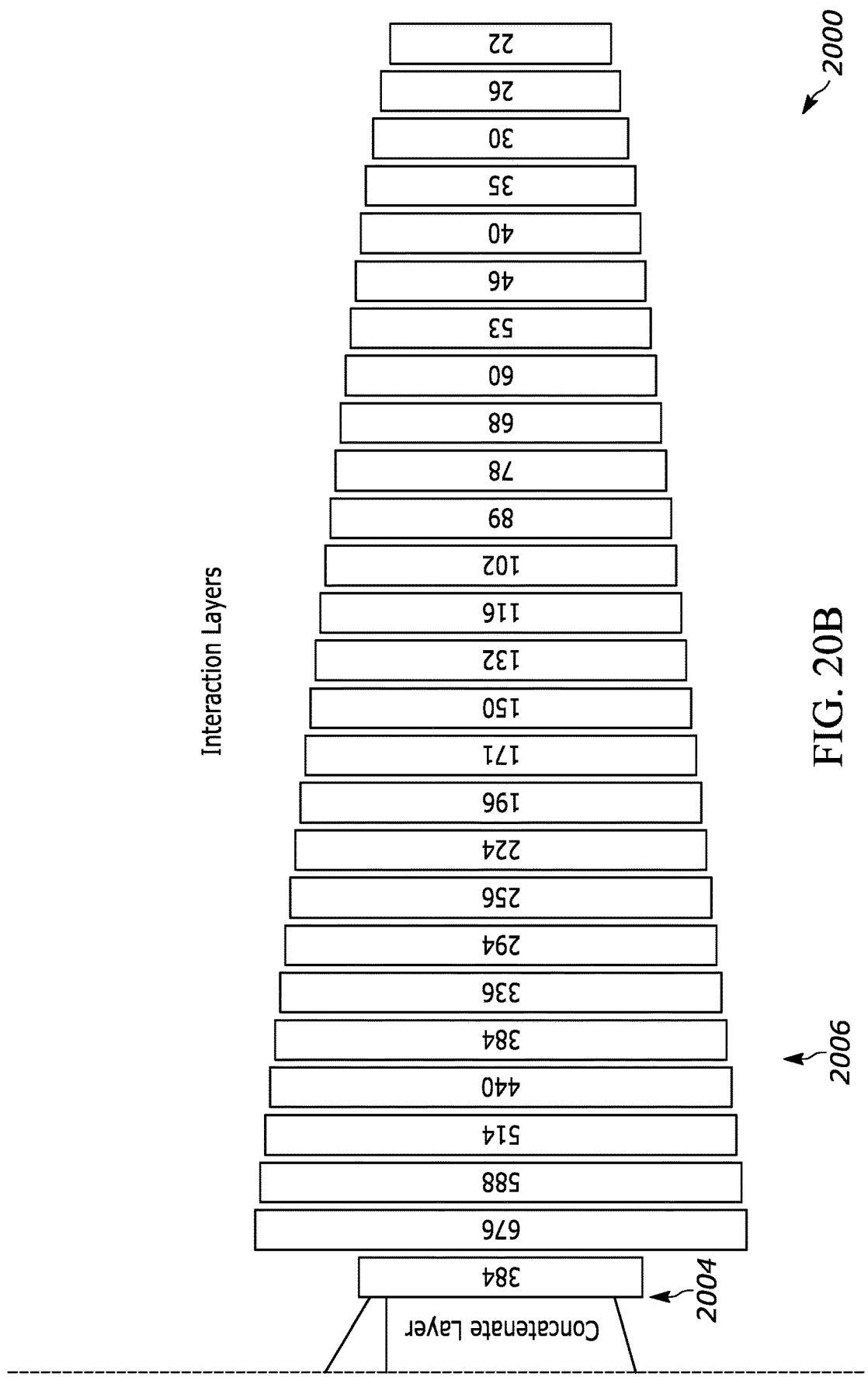

FIG. 20 illustrates a specific example of an architecture 2000 for processing data and making recommendations in accordance with this disclosure. This example architecture 2000 represents a bottleneck architecture and is designed to apply a sufficient amount of computational and representational power to each movie property to learn features about the movie properties for a recommendation task before the interaction between these features is modeled. The bottleneck expands after concatenating the individual property representations because there should be more features describing how the base features interact than there are base features. Under the information bottleneck theory, the shape of the information bottleneck can define the size of the layers in a deep neural network based on the relevant compression of the input layer with respect to the output layer.

In FIG. 20, each property uses a fixed-size graph embedding (such as one produced using Node2Vec on that property's sub-graph). The embeddings are gradually reduced in parallel to a small set of features, and the embeddings are then concatenated. After that, a larger set of interaction features are extracted and gradually reduced until the representation is slightly larger than the number of properties. In particular embodiments, the architecture 2000 is structured in three connected stages. In a first stage 2002, each property embedding (such as those having a size of 500) serves as a separate input and is processed through a multi-layer (such as a 20-layer) fully-connected neural network that shrinks at fixed percentage rate (such as from 438 hidden units on the first layer to 32 hidden units on the last layer). The use of 32 hidden units should be more than sufficient for most types of properties, although other numbers of hidden units could be supported if needed. In a second stage 2004, the final outputs of the first stage 2002 are concatenated together (such as to form an input of size 384). In a third stage 2006, the concatenated input is fed into a second series of fully-connected layers that initially increase the size (such as up to a size of 676) on the first layer and then gradually (such as over 25 layers) reduces the size of the layers (such as to a size of 22).

In some embodiments, except for the final interaction layer of the third stage 2006, each layer in the stages 2002 and 2006 can use a tanh activation function. The tanh activation function produces both positive and negative numbers, unlike a rectified linear unit (ReLu). These negative values can be useful because they allow the penalization of irrelevant properties. To prevent over-fitting on the training data, some embodiments use an L2 regularizer (such as one with a weight of 10-7). The regularization weight could be chosen using a power of ten so that the total loss of the network at its initialization is no greater than a power of ten without regularization. Since regression is performed, the final layer of the third stage 2006 may not include any activation or regularization. Weights and biases can be initialized using the He normal initializer, which bases the weights of one layer on the size of the previous layer. For back-propagation optimization, the Adam optimizer can be used with a learning rate of 0.00001.

As described above, the extraction of aspects can involve the identification and clustering of features into distinct aspects that are shared between different items. Features can be identified explicitly (such as when directly mentioned in text) or implicitly (such as when implied by other words). One challenge of aspect mining is to create an algorithm that is able to relate both explicit and implicit features to the same aspect. In some embodiments, a simultaneous feature extraction and clustering approach called CAFE can be used to identify aspects of movie plots that allow better differentiation between the movies. These plot aspects describe the movie plots with groupings of semantically-related co-occurring plot feature words. In particular embodiments, the gamma distribution of the CAFE algorithm can be set to 0.8, and 1,000 candidate terms can be used and divided into 500 seed terms and 500 non-seed terms. Since the plot summary/synopsis corpus is larger than their 500 review set, the number of candidate terms could be increased.

The strength of the aspects to each movie can be calculated and represented as weighted edges in the knowledge graph. A strength score could be calculated by counting the number of times that an aspect occurred in each movie's plot summary, plot synopsis, or review. Each plot summary, summary, or review could have an equal weight, although unequal weights could also be used (such as when certain users or sources are known to provide better summaries, synopses, or reviews). Inside each plot summary, synopsis, or review, each sentence with an aspect may or may not be given equal weight. The overall strength scores connect the movies to their aspects. In particular embodiments, 86 distinct aspects could be extracted from IMDB.COM plot summaries, which form a densely-connected network that connects movies to each other through nodes representing their shared aspects.

Since movies can be connected more densely through a multitude of different aspects, an aspect embedding with the same size as the other property embeddings contains a greater density of information. As a result, in some embodiments, there to be at least as many features about the aspect embeddings as there are aspects. Thus, some embodiments reduce the aspect input to 128 outputs instead of to 32 outputs (as is done for other properties). The first ten property layers for the aspects can be the same as the other input networks in the first stage 2002 of FIG. 20, but the property layers for the aspects can be reduced to a size of 128. To account for the extra information from the aspect embeddings, some embodiments increase the size of the interaction layers in the third stage 2006. The underlying architecture and proportions between the interaction layers for the aspects in the third stage 2006 can be the same as for the other properties. The size of the first interaction layer increases (such as to a size of 896) and gradually reduces (such as to a size of 22) over the other layers (such as the other 27 layers). All other parameters can be the same as described above.

Some embodiments train the neural network algorithm to perform a regression on user ratings. The parameter settings previously described can be used, and the neural network algorithm can train the models for 100 epochs. Of course, other suitable training techniques could be used here. The end result is a neural network that can be used to identify movies that particular users would likely rate highly, and these movies can be used as recommendations for the users.

Note that while the neural network algorithm has been described above as being used in a specific domain (namely for movie recommendations), the general framework of the neural network algorithm can be applied to any other suitable domain or domains. One potential use of this neural network approach is in more complex multi-domain interest modeling. For example, the neural network algorithm can be used to model how a user's interests in certain types of movies impact the user's likelihood of playing video games or certain types of video games. In general, the neural network algorithm can be applied to make recommendations in any desired domain or domains.

Although this disclosure has been described with reference to various example embodiments, various changes and modifications may be suggested to one skilled in the art. It is intended that this disclosure encompass such changes and modifications as fall within the scope of the appended claims.

What is claimed is:
1. A recommendation method comprising:
   determining one or more aspects of a first item based on at least one descriptive text of the first item;
   updating a knowledge graph containing multiple nodes that collectively represent multiple items, multiple users, and multiple aspects, wherein updating the knowledge graph comprises linking one or more nodes representing the one or more aspects of the first item to a node representing the first item with one or more first edges, each of the one or more first edges identifying weights associated with (i) user sentiment about the associated aspect of the first item and (ii) an importance of the associated aspect to the first item;
   creating a vector space identifying how the nodes in the knowledge graph are connected;
   using a machine learning model to generate a mimic network based on the vector space, the mimic network allowing at least one of new users, new items, or new aspects to be inserted into the mimic network without rebuilding the knowledge graph and without requiring specific behaviors of the new users to be revealed, the mimic network comprising a mimicked vector space;
   creating training data by representing user-item pairs in the vector space or the mimicked vector space;

training a recommendation model using the training data;
applying the trained recommendation model to at least a portion of the vector space or the mimicked vector space to identify a second item for recommendation to a user;
identifying at least one aspect most in common between the first item and the second item based on values of weights associated with the first item and the second item in the knowledge graph; and
displaying a recommendation of the second item to the user with an explanation, the explanation showing both the first item and the second item, the explanation further showing the at least one aspect most in common between the first item and the second item.

2. The recommendation method of claim 1, wherein updating the knowledge graph further comprises:
linking at least one node representing at least one aspect of the first item to at least one node representing at least one of the multiple users with at least one second edge, each of the at least one second edge identifying weights associated with (i) user sentiment about the associated aspect to the associated user and (ii) an importance of the associated aspect to the associated user.

3. The recommendation method of claim 1, wherein updating the knowledge graph further comprises:
adding the first item as a node to the knowledge graph when the first item is not already identified in the knowledge graph; and
adding any aspect of the first item as a node to the knowledge graph when the aspect of the first item is not already identified in the knowledge graph.

4. The recommendation method of claim 1, further comprising:
for each of the multiple users, determining (i) a first preference of the user towards a first aspect of the first item and (ii) a second preference of the user towards a second aspect of the second item; and
determining a similarity between the first aspect and the second aspect based on a comparison of the first and second preferences across the multiple users.

5. The recommendation method of claim 4, wherein the second item is in a different domain than the first item.

6. The recommendation method of claim 1, further comprising:
traversing the knowledge graph; and
for each node in the knowledge graph, identifying its neighboring node or nodes;
wherein the second item is identified based on the vector space and how a node representing the second item connects to the node representing the first item through one or more edges of the knowledge graph.

7. The recommendation method of claim 1, further comprising:
generating a graphical user interface for the user, the graphical user interface comprising:
a graphical representation of the first item; and
an identification of at least one of the one or more aspects of the first item extending from the graphical representation of the first item.

8. The recommendation method of claim 1, further comprising:
generating a graphical user interface for the user, the graphical user interface comprising:
a graphical representation of the first item;
an identification of at least one of the one or more aspects of the first item, each identified aspect of the first item being modifiable to change the importance of the aspect to the user; and
a graphical representation of multiple second items based on the importance of each identified aspect as specified within the graphical user interface.

9. The recommendation method of claim 1, further comprising:
generating a graphical user interface for the user, the graphical user interface comprising:
a graphical representation of the first item; and
a graphical representation of multiple second items recommended for the user, the multiple second items including items from at least two different domains.

10. An electronic device comprising:
at least one memory; and
at least one processor coupled to the at least one memory, the at least one processor configured to:
determine one or more aspects of a first item based on at least one descriptive text of the first item;
update a knowledge graph containing multiple nodes that collectively represent multiple items, multiple users, and multiple aspects, wherein, to update the knowledge graph, the at least one processor is configured to link one or more nodes representing the one or more aspects of the first item to a node representing the first item with one or more first edges, each of the one or more first edges identifying weights associated with (i) user sentiment about the associated aspect of the first item and (ii) an importance of the associated aspect to the first item;
create a vector space identifying how the nodes in the knowledge graph are connected;
use a machine learning model to generate a mimic network based on the vector space, the mimic network configured to allow at least one of new users, new items, or new aspects to be inserted into the mimic network without rebuilding the knowledge graph and without requiring specific behaviors of the new users to be revealed, the mimic network comprising a mimicked vector space;
create training data by representing user-item pairs in the vector space or the mimicked vector space;
train a recommendation model using the training data;
apply the trained recommendation model to at least a portion of the vector space or the mimicked vector space to identify a second item for recommendation to a user;
identify at least one aspect most in common between the first item and the second item based on values of weights associated with the first item and the second item in the knowledge graph; and
initiate display of a recommendation of the second item to the user with an explanation, the explanation showing both the first item and the second item, the explanation further showing the at least one aspect most in common between the first item and the second item.

11. The electronic device of claim 10, wherein, to update the knowledge graph, the at least one processor is further configured to link at least one node representing at least one aspect of the first item to at least one node representing at least one of the multiple users with at least one second edge, each of the at least one second edge identifying weights associated with (i) user sentiment about the associated aspect to the associated user and (ii) an importance of the associated aspect to the associated user.

12. The electronic device of claim 10, wherein the at least one processor is further configured to:
  for each of the multiple users, determine (i) a first preference of the user towards a first aspect of the first item and (ii) a second preference of the user towards a second aspect of the second item; and
  determine a similarity between the first aspect and the second aspect based on a comparison of the first and second preferences across the multiple users.

13. The electronic device of claim 10, wherein the at least one processor is further configured to:
  traverse the knowledge graph; and
  for each node in the knowledge graph, identify its neighboring node or nodes;
  wherein the at least one processor is configured to identify the second item for recommendation to the user based on the vector space and how a node representing the second item connects to the node representing the first item through one or more edges of the knowledge graph.

14. The electronic device of claim 10, wherein:
  the at least one processor is further configured to generate a graphical user interface for the user; and
  the graphical user interface comprises:
    a graphical representation of the first item; and
    an identification of at least one of the one or more aspects of the first item extending from the graphical representation of the first item.

15. The electronic device of claim 10, wherein:
  the at least one processor is further configured to generate a graphical user interface for the user; and
  the graphical user interface comprises:
    a graphical representation of the first item;
    an identification of at least one of the one or more aspects of the first item, each identified aspect of the first item being modifiable to change the importance of the aspect to the user; and
    a graphical representation of multiple second items based on the importance of each identified aspect as specified within the graphical user interface.

16. The electronic device of claim 10, wherein:
  the at least one processor is further configured to generate a graphical user interface for the user; and
  the graphical user interface comprises:
    a graphical representation of the first item; and
    a graphical representation of multiple second items recommended for the user, the multiple second items including items from at least two different domains.

17. A non-transitory computer readable medium containing computer readable program code that, when executed, causes an electronic device to:
  determine one or more aspects of a first item based on at least one descriptive text of the first item;
  update a knowledge graph containing multiple nodes that collectively represent multiple items, multiple users, and multiple aspects, wherein the computer readable program code that when executed causes the electronic device to update the knowledge graph comprises:
    computer readable program code that when executed causes the electronic device to link one or more nodes representing the one or more aspects of the first item to a node representing the first item with one or more first edges, each of the one or more first edges identifying weights associated with (i) user sentiment about the associated aspect of the first item and (ii) an importance of the associated aspect to the first item;
  create a vector space identifying how the nodes in the knowledge graph are connected;
  use a machine learning model to generate a mimic network based on the vector space, the mimic network configured to allow at least one of new users, new items, or new aspects to be inserted into the mimic network without rebuilding the knowledge graph and without requiring specific behaviors of the new users to be revealed, the mimic network comprising a mimicked vector space;
  create training data by representing user-item pairs in the vector space or the mimicked vector space;
  train a recommendation model using the training data;
  apply the trained recommendation model to at least a portion of the vector space or the mimicked vector space to identify a second item for recommendation to a user;
  identify at least one aspect most in common between the first item and the second item based on values of weights associated with the first item and the second item in the knowledge graph; and
  initiate display of a recommendation of the second item to the user with an explanation, the explanation showing both the first item and the second item, the explanation further showing the at least one aspect most in common between the first item and the second item.

18. The non-transitory computer readable medium of claim 17, wherein the computer readable program code that when executed causes the electronic device to update the knowledge graph further comprises:
  computer readable program code that when executed causes the electronic device to link at least one node representing at least one aspect of the first item to at least one node representing at least one of the multiple users with at least one second edge, each of the at least one second edge identifying weights associated with (i) user sentiment about the associated aspect to the associated user and (ii) an importance of the associated aspect to the associated user.

19. The non-transitory computer readable medium of claim 17, wherein the computer readable program code, when executed, further causes the electronic device to:
  for each of the multiple users, determine (i) a first preference of the user towards a first aspect of the first item and (ii) a second preference of the user towards a second aspect of the second item; and
  determine a similarity between the first aspect and the second aspect based on a comparison of the first and second preferences across the multiple users.

20. The non-transitory computer readable medium of claim 17, wherein the computer readable program code, when executed, further causes the electronic device to:
  traverse the knowledge graph; and
  for each node in the knowledge graph, identify its neighboring node or nodes;
  wherein the second item for recommendation to the user is based on the vector space and how a node representing the second item connects to the node representing the first item through one or more edges of the knowledge graph.

* * * * *